United States Patent
Ye et al.

(10) Patent No.: US 11,272,492 B2
(45) Date of Patent: Mar. 8, 2022

(54) TDD CONFIGURATION AND USE OF SPECIAL SUBFRAMES FOR FENB-IOTS

(71) Applicant: Intel Corporation, Santa Clara, CA (US)

(72) Inventors: Qiaoyang Ye, San Jose, CA (US); Debdeep Chatterjee, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 16/629,436

(22) PCT Filed: Aug. 9, 2018

(86) PCT No.: PCT/US2018/046039
§ 371 (c)(1),
(2) Date: Jan. 8, 2020

(87) PCT Pub. No.: WO2019/032845
PCT Pub. Date: Feb. 14, 2019

(65) Prior Publication Data
US 2020/0187173 A1     Jun. 11, 2020

Related U.S. Application Data

(60) Provisional application No. 62/710,490, filed on Feb. 16, 2018, provisional application No. 62/586,724, (Continued)

(51) Int. Cl.
*H04W 72/04*     (2009.01)
*H04W 76/27*     (2018.01)
(Continued)

(52) U.S. Cl.
CPC ......... *H04W 72/042* (2013.01); *H04L 1/0068* (2013.01); *H04L 5/14* (2013.01);
(Continued)

(58) Field of Classification Search
CPC ............... H04W 72/042; H04W 76/27; H04W 72/1289; H04L 1/0068; H04L 5/14;
(Continued)

(56) References Cited

U.S. PATENT DOCUMENTS

2016/0381681 A1*  12/2016  Nogami ............ H04W 72/0446
                                                       370/280
2018/0049006 A1*  2/2018   Hong ...................... H04L 69/28
(Continued)

FOREIGN PATENT DOCUMENTS

CN         106982110 A       7/2017
WO      WO-2016163645 A1   10/2016
(Continued)

OTHER PUBLICATIONS

"International Application Serial No. PCT/US2018/046039, International Search Report dated Dec. 3, 2018", 3 pgs.
(Continued)

*Primary Examiner* — Shailendra Kumar
(74) *Attorney, Agent, or Firm* — Schwegman Lundberg & Woessner, P.A.

(57) ABSTRACT

Embodiments of a User Equipment (UE), generation Node-B (gNB) and methods of communication are generally described herein. A radio frame may be configured for time-division duplexing (TDD) operation, and may comprise: one or more downlink subframes, one or more uplink subframes, and a special subframe that occurs immediately after one of the downlink subframes and immediately before one of the uplink subframes. The UE may receive a narrowband physical downlink shared channel (NPDSCH) sent at least partly in the special subframe. The UE may, if a number of repetitions of the NPDSCH is greater than one, decode the NPDSCH based on a de-puncture operation for the special subframe. The UE may, if the number of repeti-
(Continued)

tions of the NPDSCH is equal to one, decode the NPDSCH based on a rate match operation for the special subframe.

20 Claims, 12 Drawing Sheets

Related U.S. Application Data filed on Nov. 15, 2017, provisional application No. 62/565,779, filed on Sep. 29, 2017, provisional application No. 62/543,530, filed on Aug. 10, 2017.

(51) Int. Cl.
*H04L 1/00* (2006.01)
*H04L 5/14* (2006.01)
*H04L 12/24* (2006.01)
*G16Y 10/75* (2020.01)
*H04L 41/0806* (2022.01)

(52) U.S. Cl.
CPC ......... *H04L 41/0806* (2013.01); *H04W 76/27* (2018.02); *G16Y 10/75* (2020.01)

(58) Field of Classification Search
CPC . H04L 41/0806; H04L 5/0053; H04L 5/1469; H04L 5/0094; H04L 1/0075; H04L 1/08; G16Y 10/75
See application file for complete search history.

(56) References Cited

U.S. PATENT DOCUMENTS

| | | | |
|---|---|---|---|
| 2018/0084572 A1 | 3/2018 | You et al. | |
| 2018/0234951 A1* | 8/2018 | Somichetty | H04W 72/0446 |
| 2019/0190758 A1* | 6/2019 | Hwang | H04L 5/0007 |
| 2019/0239057 A1* | 8/2019 | Hwang | H04L 27/26 |

FOREIGN PATENT DOCUMENTS

| | | |
|---|---|---|
| WO | WO-2017014602 A1 | 1/2017 |
| WO | WO-2017057870 A1 | 4/2017 |

OTHER PUBLICATIONS

"International Application Serial No. PCT/US2018/046039, Written Opinion dated Dec. 3, 2018", 4 pgs.

Huawel, et al., "TDD support for NB-IoT in Rel-15", RP-162161, 3GPP TSG RAN Meeting #74, Vienna, Austria, (Nov. 29, 2016), 5-9 pgs.

J, Schlienz, et al., "Narrowband Internet of Things", Rohde & Schwarz,Whitepaper, version OE, [Online] Retrieved from the internet: <https://www.rohde-schwarz.com/kr/applicat ions/white paper _23 0854-314242.html?rusprivacypolicy=I>, (Aug. 8, 2016), 37-38 pgs.

"International Application Serial No. PCT/US2018/046039, International Preliminary Report on Patentability dated Feb. 20, 2020", 6 pgs.

"3 Generation Partnership Project; Technical Specification Group Radio Access Network; Evolved Universal Terrestrial Radio Access (E-UTRA); Multiplexing and channel coding (Release 14)", 3GPP Standard ; Technical Specification ; 3GPP TS 36.212. 3rd Generation Partnership Project (3GPP). Mobile Competence Centre; 650. Route Des Lucioles ; F-06921 Sophia-Antipolis Cedex ; France, vol. RAN WG1. No. V14.3.0, (Jun. 23, 2017), 1-198.

"European Application Serial No. 18845146.2, Extended European Search Report dated Mar. 19, 2021", 9 pgs.

"On the synchronization signal design for NB-IoT", R1-157274, 3GPP TSG-RAN WG1 Meeting #83, (Nov. 6, 2015).

* cited by examiner

TDD CONFIGURATION AND USE OF SPECIAL SUBFRAMES FOR FENB-IOTS

PRIORITY CLAIM

This application is a U.S. National Stage Filing under 35 U.S.C. 371 from International Application No. PCT/US2018/046039, filed Aug. 9, 2018 and published in English as WO 2019/032845 on Feb. 14, 2019, which claims priority under 35 USC 119(e) to United States Provisional Patent Application Ser. No. 62/543,530, filed Aug. 10, 2017, and to United States Provisional Patent Application Ser. No. 62/565,779, filed Sep. 29, 2017, and to United States Provisional Patent Application Ser. No. 62/586,724, filed Nov. 15, 2017, and to United States Provisional Patent Application Ser. No. 62/710,490, filed Feb. 16, 2018, all of which are incorporated herein by reference in their entirety.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks. Some embodiments relate to Fifth Generation (5G) networks. Some embodiments relate to New Radio (NR) networks. Some embodiments relate to further enhanced internet-of-things (feNB-IoT) techniques. Some embodiments relate to internet-of-things (IoT) techniques.

BACKGROUND

Mobile devices may exchange data in accordance with time-division duplexing (TDD) arrangements. Such systems may be useful in various scenarios. For instance, when a block of spectrum is available, but blocks of paired spectrum are not available, a TDD arrangement may be a good option. In some scenarios, switches between downlink and uplink (in one or both directions) may be accomplished using guard periods. However, scheduling the time resources around the guard periods may be challenging. Accordingly, there is a general need for methods and systems to enable TDD operation in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
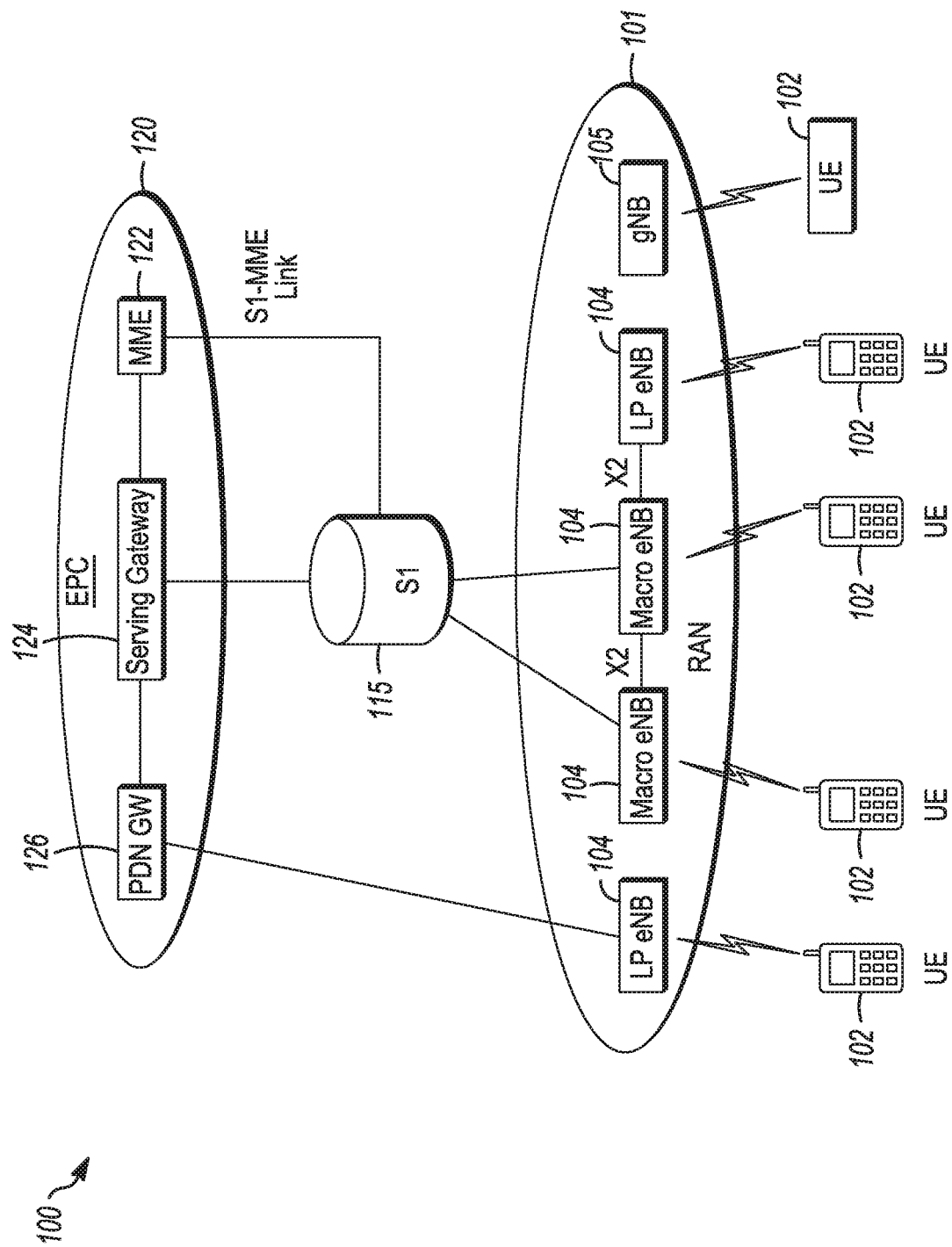
FIG. 1A is a functional diagram of an example network in accordance with some embodiments.
Figure 1B:
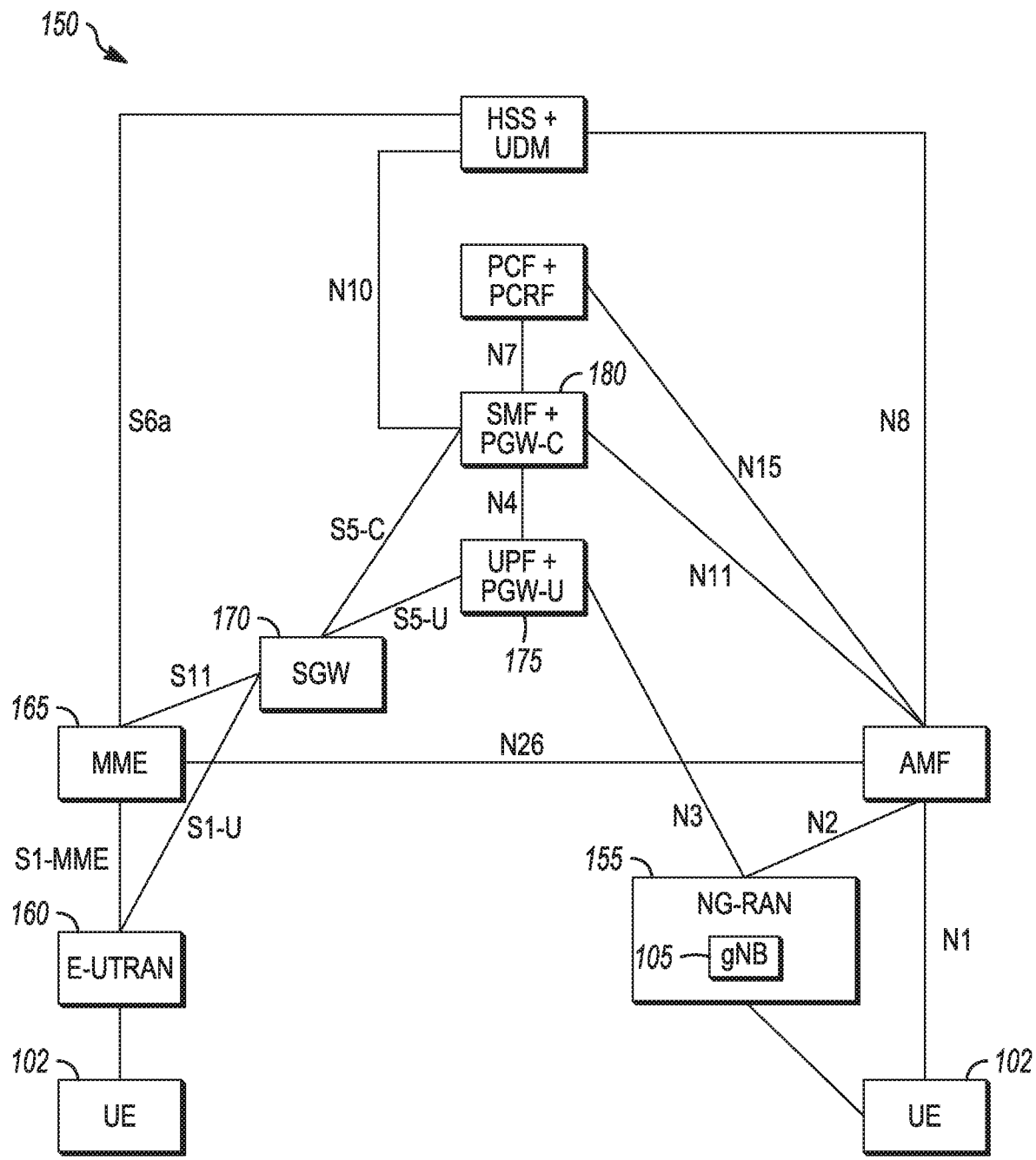
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102 and/or eNBs 104 may be configured to operate in accordance with an NR protocol and/or NR techniques. References to a UE 102, eNB 104 and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, one or more of the UEs 102, eNBs 104 and/or gNBs 105 may be configured to operate in accordance with technique(s), protocol(s) and/or standard(s) related to one or more of: internet-of-things (IoT), narrowband IoT (NB IoT), enhanced NB IoT (eNB-IoT), further enhanced narrowband IoT (feNB-IoT) and/or other.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
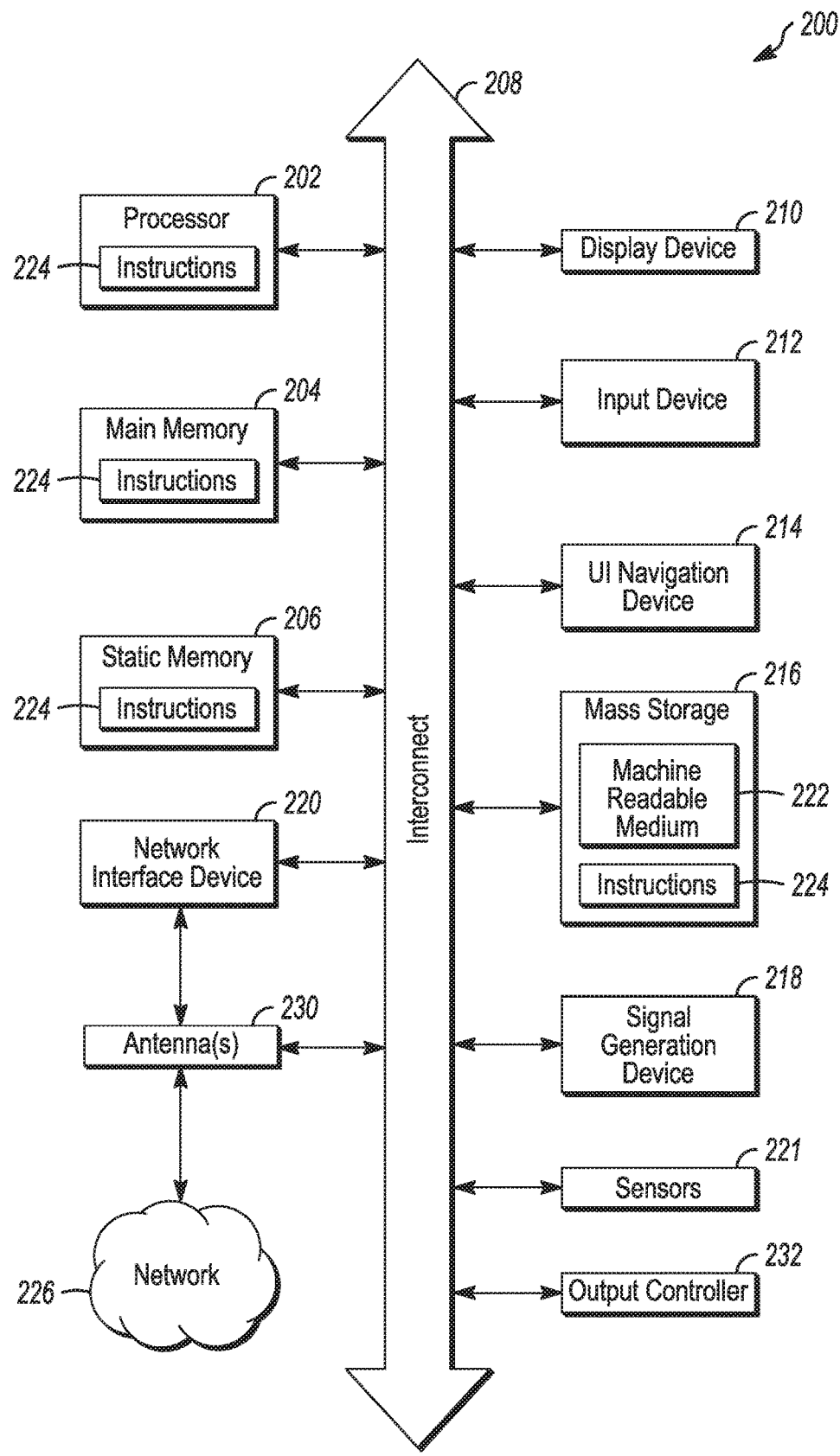
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks). Plain Old Telephone (POTS) networks, and wireless data networks (e.g., Institute of Electrical and Electronics Engineers (IEEE) 802.11 family of standards known as Wi-Fi®. IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
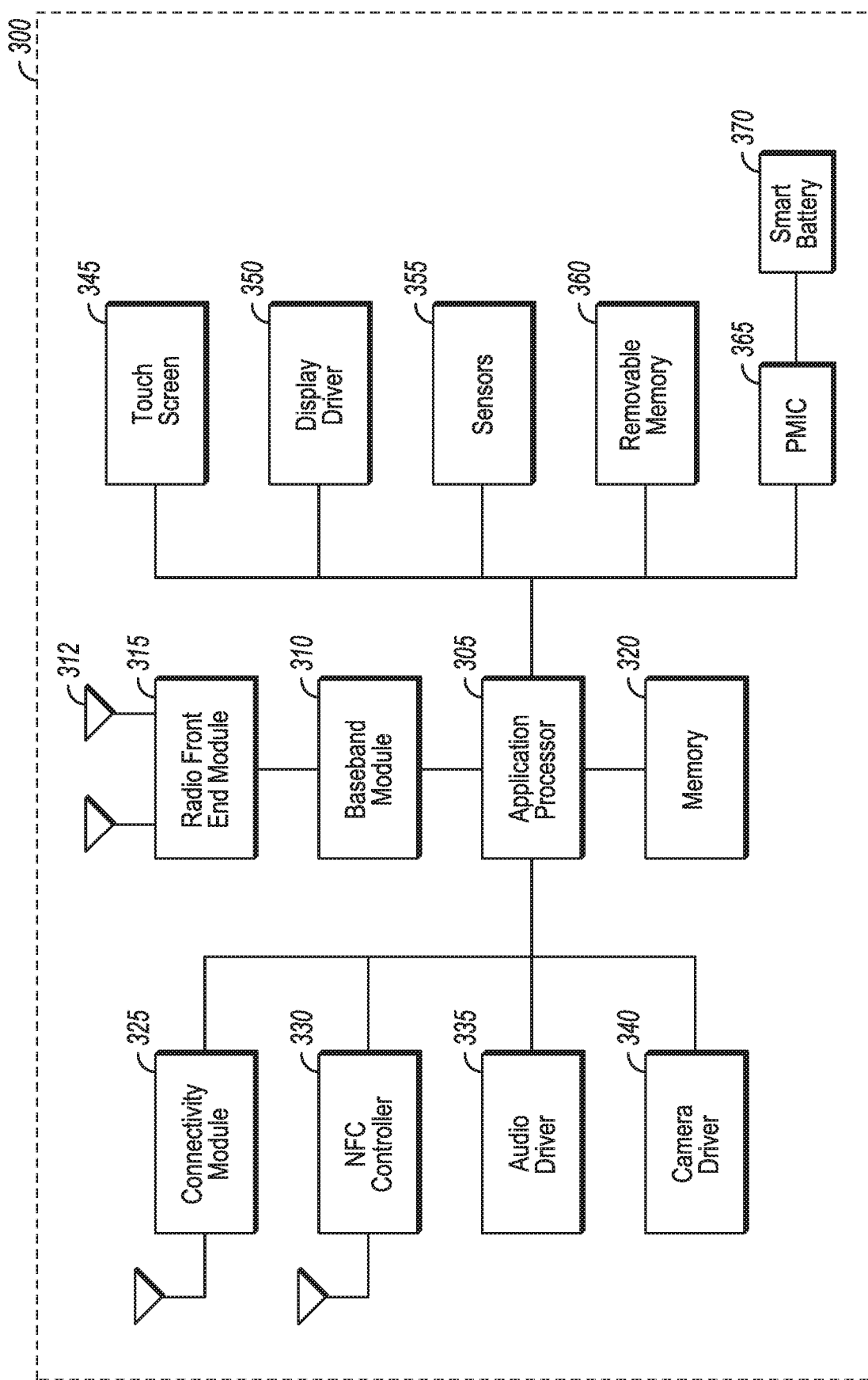
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
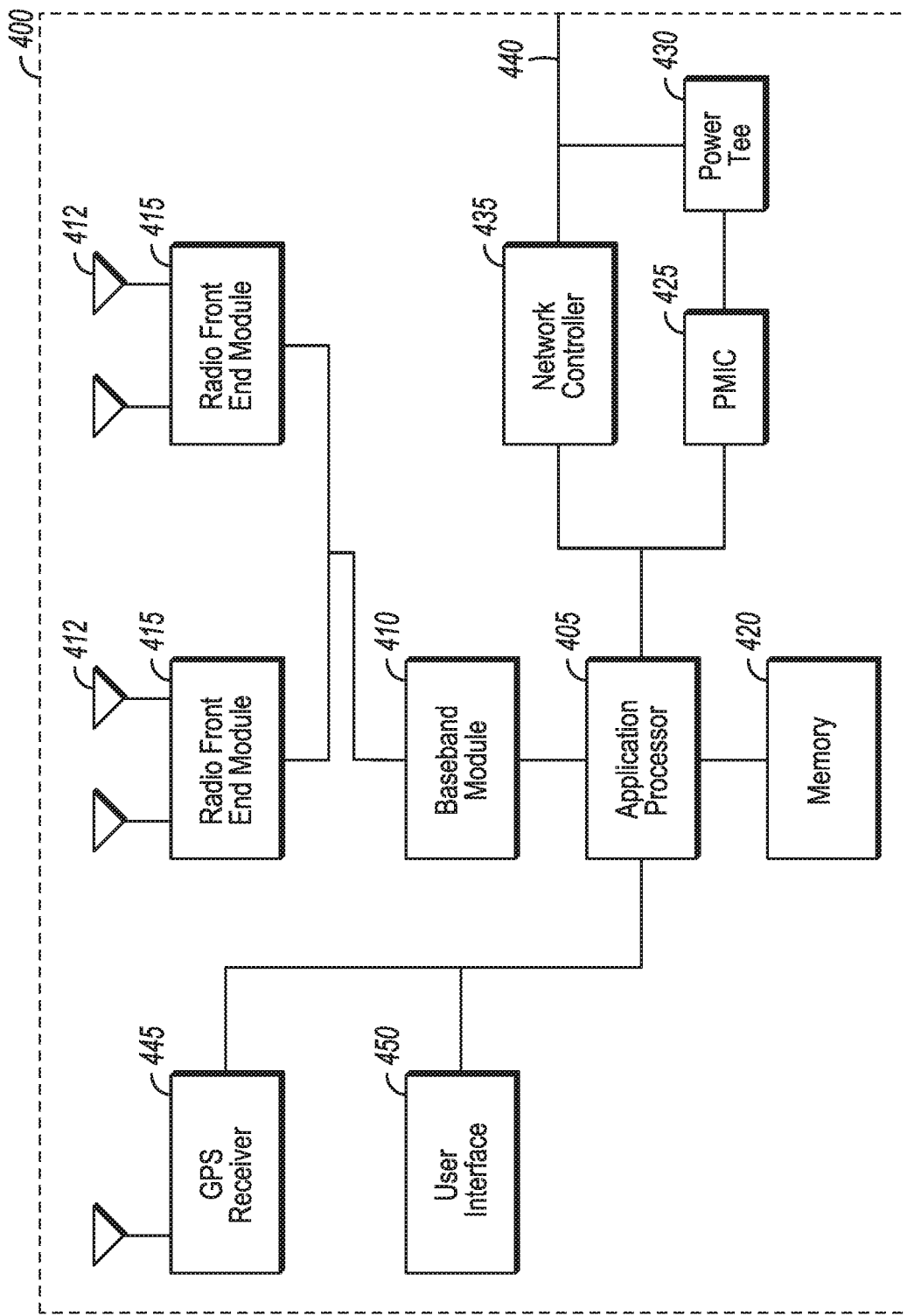
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with an aspect. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
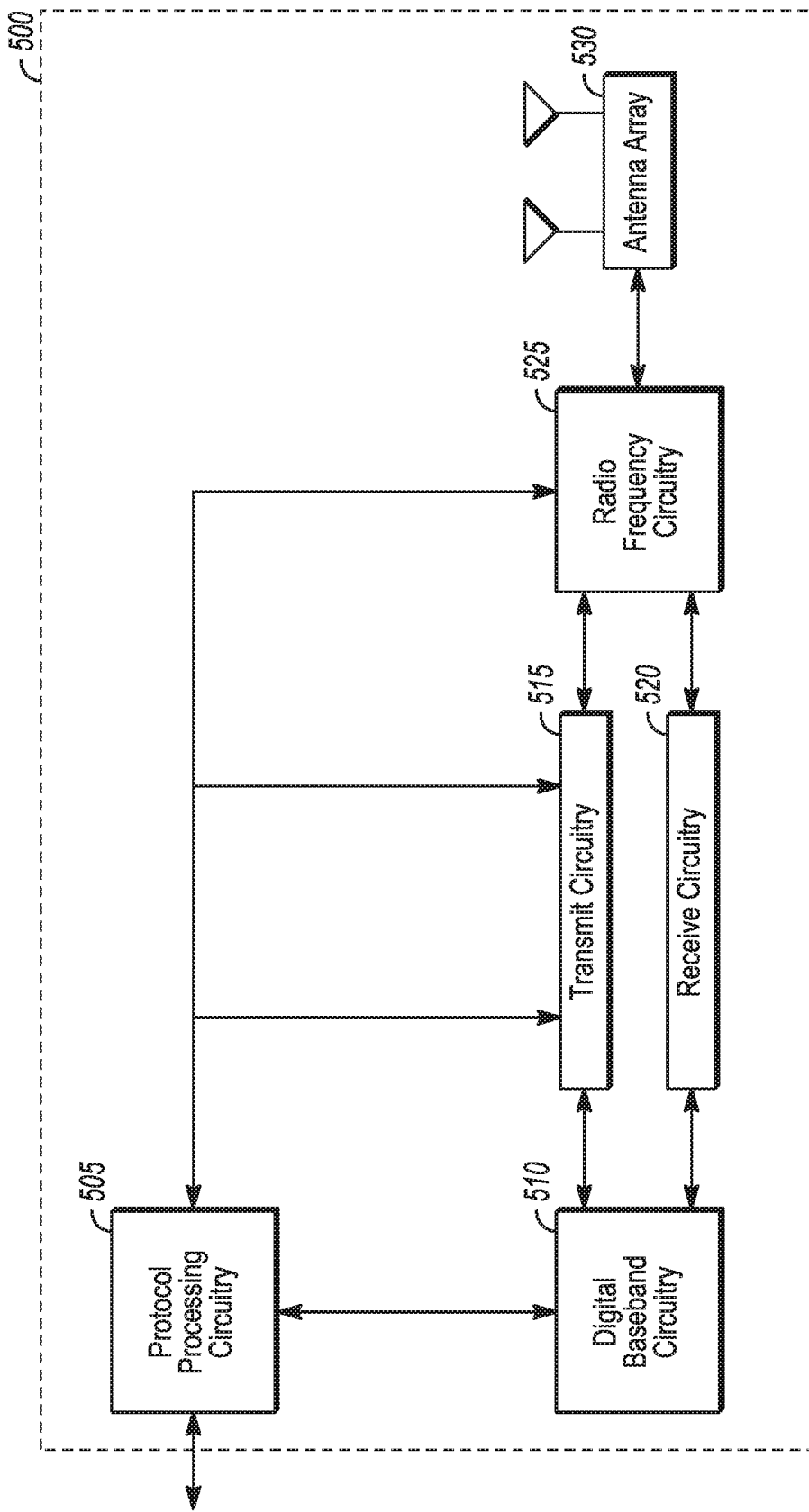
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
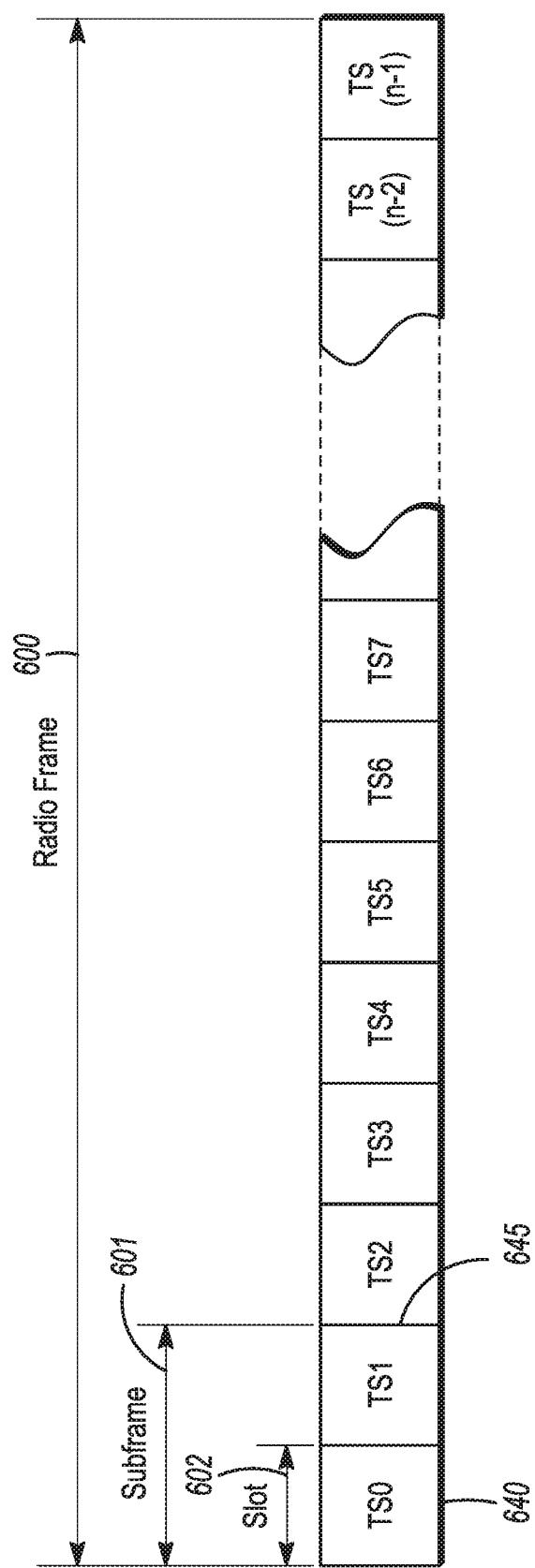
FIG. 6 illustrates an example of a radio frame structure in accordance with some embodiments.
Figure 7A:
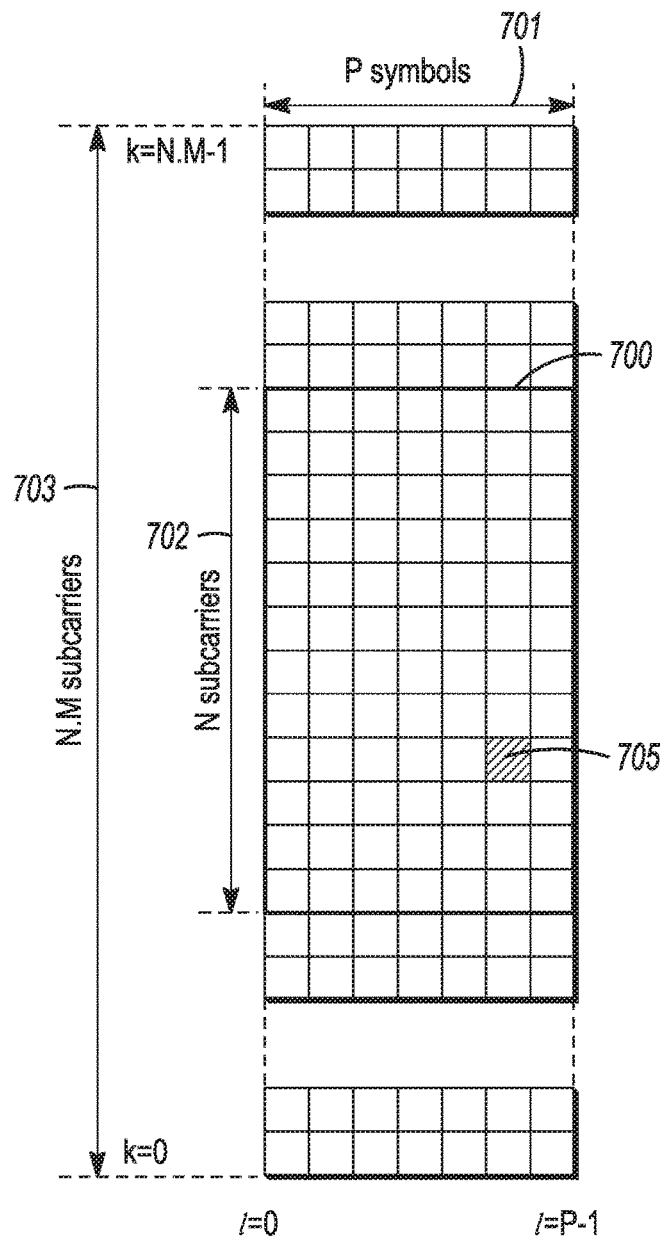
FIG. 7A and FIG. 7B illustrate example frequency resources in accordance with some embodiments.
Figure 7B:
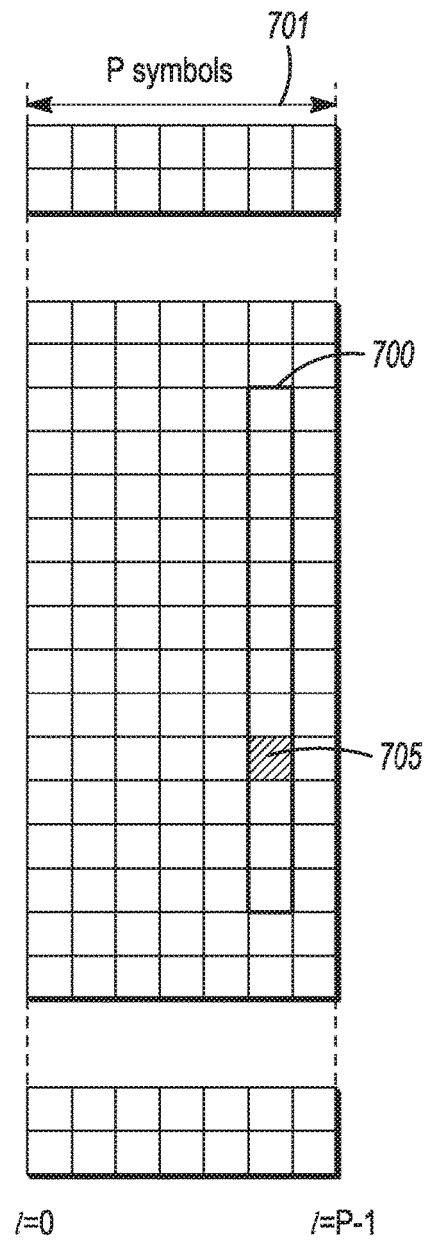

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

Referring to FIGS. 7A and 7B, in some aspects, a sub-component of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, 1) where k is the index number of subcarrier, in the range 0 to N·M−1 (as indicated by 703), where N is the number of subcarriers in a resource block, and M is the number of resource blocks spanning a component carrier in the frequency domain.

In accordance with some embodiments, the UE 102 may receive a system information block type-1 narrowband (SIB1-NB) that indicates a subframe configuration for a radio frame configured for time-division duplexing (TDD) operation. The subframe configuration may comprise: one or more downlink subframes, one or more uplink subframes, and a special subframe that occurs immediately after one of the downlink subframes and immediately before one of the uplink subframes. The special subframe may comprise a downlink portion (DwPTS), a guard period (GP), and an uplink portion (UpPTS). The UE 102 may receive a narrowband physical downlink control channel (NPDCCH) that indicates a number of repetitions of a narrowband physical downlink shared channel (NPDSCH) sent at least partly in the special subframe. The UE 102 may, if the number of repetitions is greater than one, decode the NPDSCH based on a de-puncture operation for the special subframe. The UE 102 may, if the number of repetitions is equal to one, decode the NPDSCH based on a rate match operation for the special subframe. These embodiments are described in more detail below.

Figure 8:
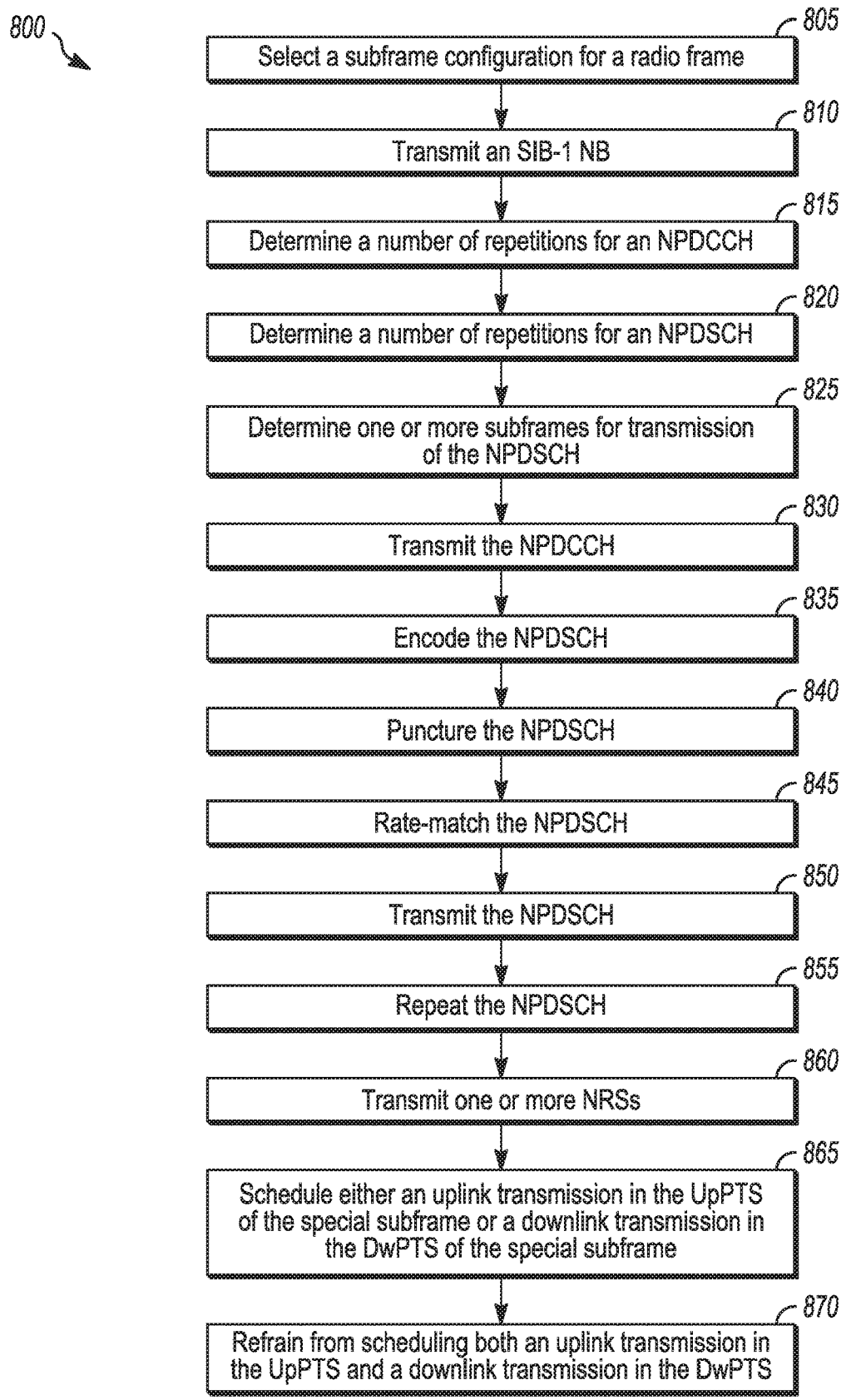
FIG. 8 illustrates the operation of a method of communication in accordance with some embodiments.
Figure 9:
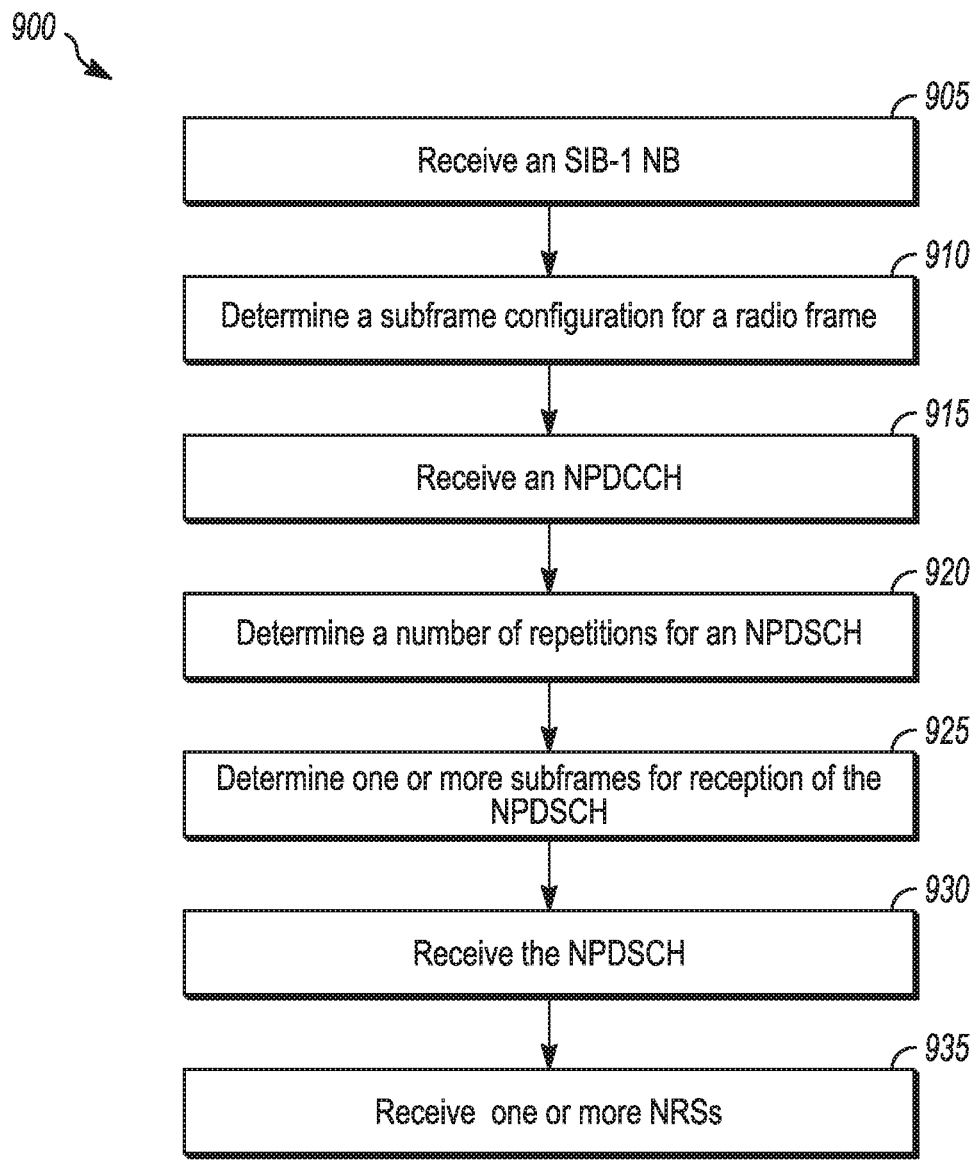
FIG. 9 illustrates the operation of another method of communication in accordance with some embodiments.

FIG. 8 illustrates the operation of a method of communication in accordance with some embodiments. FIG. 9 illustrates the operation of another method of communication in accordance with some embodiments. In describing the methods 800 and 900, reference may be made to one or more of FIGS. 1-10, although it is understood that the methods 800 and 900 may be practiced with any other suitable systems, interfaces and components. In some cases, descriptions herein of one or more of the concepts, operations and/or techniques regarding one of the methods described herein (800, 900 and/or other) may be applicable to at least one of the other methods described herein (800, 900 and/or other).

Some embodiments of the method 800 may include additional operations in comparison to what is illustrated in FIG. 8, including but not limited to operations described herein. Some embodiments of the method 800 may not necessarily include all of the operations shown in FIG. 8. In addition, embodiments of the method 800 are not necessarily limited to the chronological order that is shown in FIG. 8. In some embodiments, a gNB 105 may perform one or more operations of the method 800, but embodiments are not limited to performance of the method 800 and/or operations of it by the gNB 105. Accordingly, although references may be made to performance of one or more operations of the method 800 by the gNB 105 in descriptions herein, it is understood that the eNB 104, UE 102 and/or other device may perform one or more operations that may be the same as, similar to and/or reciprocal to one or more of the operations of the method 800, in some embodiments.

Some embodiments of the method 900 may include additional operations in comparison to what is illustrated in FIG. 9, including but not limited to operations described herein. Some embodiments of the method 900 may not necessarily include all of the operations shown in FIG. 9. In addition, embodiments of the method 900 are not necessarily limited to the chronological order that is shown in FIG. 9. In some embodiments, a UE 102 may perform one or more operations of the method 900, but embodiments are not limited to performance of the method 900 and/or operations of it by the UE 102. Accordingly, although references may be made to performance of one or more operations of the method 900 by the UE 102 in descriptions herein, it is understood that the eNB 104, gNB 105 and/or other device may perform one or more operations that may be the same as, similar to and/or reciprocal to one or more of the operations of the method 900, in some embodiments.

In some cases, operations and techniques described as part of the method 800 may be relevant to the method 900. In some cases, operations and techniques described as part of the method 900 may be relevant to the method 800. In addition, embodiments of the method 900 may include one or more operations that may be the same as, similar to or reciprocal to one or more operations of the method 800 (and/or other operation(s) described herein). For instance, an operation of the method 800 may include transmission of an element (such as a frame, block, message and/or other) by the gNB 105 and the method 900 may include reception of a same or similar element by the UE 102.

While the methods 800 and 900 and other methods described herein may refer to eNBs 104, gNBs 105 or UEs 102 operating in accordance with 3GPP standards, 5G standards, NR standards, feNB-IoT standards and/or other standards, embodiments of those methods are not limited to just those eNBs 104, gNBs 105 or UEs 102 and may also be practiced on other devices, such as a Wi-Fi access point (AP) or user station (STA). In addition, the methods 800, 900 and other methods described herein may be practiced by wireless devices configured to operate in other suitable types of wireless communication systems, including systems configured to operate according to various IEEE standards such as IEEE 802.11. The methods 800, 900 and other methods described herein may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the messages described herein may be included in a standard and/or protocol, including but not limited to Third Generation Partnership Project (3GPP), 3GPP Long Term Evolution (LTE). Fourth Generation (4G), Fifth Generation (5G). New Radio (NR), feNB-IoT and/or other. The scope of embodiments is not limited to usage of elements that are included in standards, however.

In some embodiments, the UE 102 may be arranged to operate in accordance with a further enhanced narrowband internet-of-things (feNB-IoT) protocol, although the scope of embodiments is not limited in this respect. In some embodiments, the gNB 105 may be arranged to operate in accordance with a further enhanced narrowband internet-of-things (feNB-IoT) protocol, although the scope of embodiments is not limited in this respect.

At operation 805, the gNB 105 may select a subframe configuration for a radio frame. In some embodiments, the subframe configuration may include one or more uplink subframes, one or more downlink subframes, and a special subframe. In some embodiments, the subframe configuration may include one or more uplink subframes, one or more downlink subframes, and one or more special subframes. In some embodiments, the subframe configuration may include two or more special subframes.

It should be noted that one or more operations, techniques, methods and/or aspects may be described herein in terms of one special subframe, but such references are not limiting. It is understood that some or all of those operations, techniques, methods and/or aspects may be applicable to configurations that include two or more special subframes in the radio frame.

In some embodiments, the special subframe may occur immediately after one of the downlink subframes and immediately before one of the uplink subframes. In some embodiments, one or more special subframes may be included in the radio frame. Each of those special subframes may be immediately after a downlink subframe and immediately before an uplink subframe.

In some embodiments, the special subframe may include a downlink portion (DwPTS), followed by a guard period (GP), followed by an uplink portion (UpPTS).

In some embodiments, the gNB 105 may select the configuration for the radio frame from a plurality of candidate configurations. In a non-limiting example, the gNB 105 may select the configuration for the radio frame based on one or more of: an amount of downlink data to be transmitted to one or more UEs 102, an amount of uplink data to be transmitted by the one or more UEs 102 and/or other factor(s).

In some embodiments, at least one of the candidate configurations may include one or more uplink subframes, one or more downlink subframes, and a special subframe. In some embodiments, at least one of the candidate configurations may include one or more uplink subframes, one or more downlink subframes, and one or more special subframes. In some embodiments, at least one of the candidate configurations may be configurable to include two or more special subframes.

In some embodiments, for each of the candidate configurations, the radio frame may include ten subframes, comprising: one or more uplink subframes, at least four downlink subframes, and a special subframe. For instance, configurations that include less than four downlink subframes may not be included in the candidate configurations, in some embodiments.

At operation 810, the gNB 105 may transmit a system information block type-1 narrowband (SIB1-NB). In some embodiments, the SIB1-NB may indicate the selected configuration for the radio frame. In some embodiments, the SIB1-NB may include configuration information, in addition to or instead of the selected configuration.

It should be noted that embodiments are not limited to usage of the SIB1-NB for operation 810, as other elements (including other types of SIBs) may be used, in some embodiments. The SIB1-NB may be included in a 3GPP protocol and/or feNB-IoT protocol, in some embodiments. It should be noted that embodiments are not limited to usage of the SIB1-NB this operation and/or other operations described herein, as any suitable element may be used.

At operation 815, the gNB 105 may determine a number of repetitions for a narrowband physical downlink control channel (NPDCCH). In some embodiments, the gNB 105 may determine the number of repetitions for the NPDCCH based at least partly on one or more of: a target decoding performance level at the UE 102, a target performance level at the UE 102, a target signal quality level at the UE 102, a level of coverage enhancement and/or other factor(s).

At operation 820, the gNB 105 may determine a number of repetitions for a narrowband physical downlink shared channel (NPDSCH). In some embodiments, the gNB 105 may determine the number of repetitions for the NPDSCH based at least partly on one or more of: a target decoding performance level at the UE 102, a target performance level at the UE 102, a target signal quality level at the UE 102, a level of coverage enhancement and/or other factor(s).

In some embodiments, the gNB 105 may determine the number of repetitions for the NPDCCH and the number of repetitions for the NPDSCH independently. In some embodiments, the determination of the number of repetitions for the NPDCCH and the determination of the number of repetitions for the NPDSCH may be related, combined and/or dependent. In some embodiments, the gNB 105 may determine the number of repetitions for the NPDCCH and the number of repetitions for the NPDSCH jointly. Accordingly, the two independent numbers of repetitions may not necessarily be performed in those embodiments. In some embodiments, the number of repetitions for the NPDCCH and the number of repetitions for the NPDSCH may be the same. For instance, the gNB 105 may determine one number of repetitions, and may apply it to both the NPDCCH and the NPDSCH. In some embodiments, the number of repetitions for the NPDCCH and the number of repetitions for the NPDSCH may be potentially different.

At operation 825, the gNB 105 may determine one or more subframes to be used for transmission of the NPDSCH. In some embodiments, the gNB 105 may select one or more subframes of the radio frame for the transmission of the NPDSCH. In some embodiments, the selected radio frames may or may not include the special subframe. One or more factors may be used to determine which subframes are to be used, including but not limited to: an amount of data to be transmitted, a number of downlink subframes in the radio frame, a number of symbol periods in the DwPTS and/or other factor(s).

At operation 830, the gNB 105 may transmit the NPDCCH. In some embodiments, the NPDCCH may include one or more of: the number of repetitions to be used for the transmission of the NPDSCH, time resources to be used for the transmission of the NPDSCH, schedule information, frequency resources to be used for the transmission of the NPDSCH, configuration information and/or other information.

At operation 835, the gNB 105 may encode the NPDSCH. At operation 840, the gNB 105 may puncture the NPDSCH. At operation 845, the gNB 105 may rate match the NPDSCH. At operation 850, the gNB 105 may transmit the NPDSCH. At operation 855, the gNB 105 may repeat the NPDSCH. It should be noted that in some embodiments, the method 800 may not necessarily include all of operations 835-855. In some embodiments, the method 800 may include one or more of operations 835-855.

In some embodiments, whether or not an operation of 835-855 is performed may depend on factor(s) such as the number of repetitions of the NPDSCH and/or other(s).

In some embodiments, if a number of repetitions of the NPDCCH is greater than one, the gNB 105 may puncture the NPDCCH for transmission in the DwPTS, wherein the NPDSCH is punctured in symbol periods of the GP and the UpPTS. If the number of repetitions of the NPDCCH is equal to one, the gNB 105 may rate match the NPDCCH for transmission in the DwPTS according to the number of symbols during DwPTS.

In some embodiments, if the number of repetitions of the NPDSCH is greater than one and if the special subframe is selected for the transmission of the NPDSCH, the gNB 105 may: encode and rate match the NPDSCH based on regular downlink subframe; and puncture the NPDSCH for transmission in the DwPTS, wherein the NPDSCH is punctured in symbol periods that correspond to the GP and UpPTS.

In some embodiments, if the number of repetitions of the NPDSCH is greater than one and if the special subframe and a downlink subframe immediately before the special subframe are selected for the transmission of the NPDSCH, the gNB 105 may: encode the NPDSCH for transmission in the special subframe and the downlink subframe immediately before the special subframe in accordance with a rate match. The rate match may be based at least partly on a number of symbol periods that is a sum of: a number of symbol periods of the downlink subframe immediately before the special subframe, and a number of symbol periods of the DwPTS. For instance, a number of symbol periods equal to the sum may be used, in some embodiments.

In some embodiments, if the number of repetitions of the NPDSCH is greater than one, and if the special subframe and a next downlink subframe after the special subframe are selected for the transmission of the NPDSCH, the gNB 105 may: encode the NPDSCH for transmission in the special subframe and the next downlink subframe in accordance with a rate match. The rate match may be at least partly based on a number of symbol periods that is a sum of: a number of symbol periods of the next downlink subframe, and a number of symbol periods of the DwPTS. For instance, a number of symbol periods equal to the sum may be used, in some embodiments.

In some embodiments, if the number of repetitions of the NPDSCH is greater than one, and an additional downlink subframe is selected for the transmission of the NPDSCH, the gNB 105 may encode the NPDSCH for transmission in the additional subframe based on a number of symbol periods of the additional downlink subframe. In a non-limiting example, one repetition of the NPDSCH may be transmitted in the special subframe and another downlink subframe, and may be encoded in accordance with rate matching. Additional repetitions of the NPDSCH may be transmitted (without the rate matching) in other downlink subframes.

At operation 860, the gNB 105 may transmit narrowband reference signals (NRSs).

In a non-limiting example, the special subframe and the downlink subframes may include 14 symbol periods. The gNB 105 may transmit first NRSs in a first plurality of symbol periods of the downlink subframes. Symbol periods of the downlink subframes may be indexed by 0-13, and the first plurality of symbol periods may be indexed by 5, 6, 12, and 13. The gNB 105 may transmit second NRSs in a second plurality of symbol periods of the DwPTS. Symbol periods of the DwPTS may be indexed by 0-13, and the second plurality of symbol periods are indexed by 5, 6, 9, and 10. For instance, symbol periods #12 and #13 of the downlink subframes include NRSs. However, symbol periods #12 and #13 of the special subframe may be allocated for the GP and/or UpPTS. Accordingly, NRSs may not be included in those symbol periods of the special subframe, in some embodiments.

At operation 865, the gNB 105 may schedule either an uplink transmission in the UpPTS of the special subframe or a downlink transmission in the DwPTS of the special subframe. At operation 870, the gNB 105 may refrain from scheduling both an uplink transmission in the UpPTS and a downlink transmission in the DwPTS. It should be noted that embodiments may include one or more of operations 865-870. Some embodiments may not necessarily include both of operations 865-870. Some embodiments may not necessarily include any of operations 865-870.

In some embodiments, the gNB 105 may perform one or more of: schedule one or more uplink transmissions in the UpPTS, and schedule one or more downlink transmissions in the DwPTS of the special subframe. In some embodiments, the gNB 105 may perform one (but not both) of: schedule one or more uplink transmissions in the UpPTS, and schedule one or more downlink transmissions in the DwPTS of the special subframe. In some embodiments, the gNB 105 may refrain from scheduling both uplink transmissions in the UpPTS and downlink transmissions in the DwPTS.

In a non-limiting example, the gNB 105 may schedule one (but not both) of: an uplink transmission in the UpPTS, and a downlink transmission in the DwPTS.

In another non-limiting example, the gNB 105 may allocate the UpPTS for narrowband physical random access channel (NPRACH) transmissions and may refrain from scheduling downlink transmissions during the DwPTS.

In some embodiments, one physical resource block (PRB) may be used for transmission in accordance with the feNB-IoT protocol/technique. The scope of embodiments is not limited to usage of one PRB, however, as any suitable frequency resources may be used.

It should be noted that descriptions herein of some operations and/or techniques may refer to PRBs, symbol periods and/or sub-frames, but such references are not limiting. In some embodiments, other time resources and/or frequency resources may be used in one or more of those operations and/or techniques.

In some embodiments, an apparatus of a gNB 105 may comprise memory. The memory may be configurable to store the NPDSCH. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to encoding of the NPDSCH. The apparatus may include a transceiver to transmit the NPDSCH. The transceiver may transmit and/or receive other blocks, messages and/or other elements.

At operation 905, the UE 102 may receive an SIB1-NB. In some embodiments, the SIB1-NB may indicate a subframe configuration for a radio frame configured for time-division duplexing (TDD) operation. The subframe configuration may comprise: one or more downlink subframes, one or more uplink subframes, and a special subframe that occurs immediately after one of the downlink subframes and immediately before one of the uplink subframes. In some embodiments, uplink subframes may be allocated for uplink transmissions, the downlink subframes may be allocated for downlink transmissions, and the special subframe may be allocated to enable a transition between the downlink transmissions and the uplink transmissions.

At operation 910, the UE 102 may determine a subframe configuration for a radio frame. In some embodiments, the subframe configuration for the radio frame may be determined based on the SIB1-NB indication, although the scope of embodiments is not limited in this respect.

At operation 915, the UE 102 may receive an NPDCCH. In some embodiments, the NPDCCH may indicate a number of repetitions of an NPDSCH sent at least partly in the special subframe. In some embodiments, the NPDCCH may indicate one or more subframes to be used for reception of the NPDSCH. In some embodiments, the NPDCCH may indicate one or more subframes used for transmission of the NPDSCH.

At operation 920, the UE 102 may determine the number of repetitions for an NPDSCH. In some embodiments, the UE 102 may determine the number of repetitions for an NPDSCH based at least partly on the NPDCCH, although the scope of embodiments is not limited in this respect.

At operation 925, the UE 102 may determine one or more subframes for reception of the NPDSCH. In some embodiments, the UE 102 may determine the one or more subframes for reception of the NPDSCH based at least partly on the NPDCCH, although the scope of embodiments is not limited in this respect At operation 930, the UE 102 may receive the NPDSCH. At operation 935, the UE 102 may receive one or more NRSs.

In some embodiments, if the number of repetitions of the NPDSCH is greater than one, the UE 102 may receive the NPDSCH assuming the rate matching of NPDSCH is the same as regular downlink subframe with the symbols on guard period and UpPTS region punctured for the special subframe. If the number of repetitions of the NPDSCH is equal to one, the UE 102 may receive the NPDSCH based on a rate match operation for the special subframe where the NPDSCH is rate matched to the number of symbols within the DwPTS region.

In some embodiments, if the number of repetitions of the NPDSCH is greater than one, the UE 102 may perform the rate match operation based on a sum of: a number of symbol periods per downlink subframe, and a number of symbol periods of the DwPTS. For instance, a number of symbol periods equal to the sum may be used, in some embodiments.

In some embodiments, if the number of repetitions of the NPDSCH is greater than one, the UE 102 may perform the rate match operation for: the special subframe and a downlink subframe immediately before the special subframe, or the special subframe and a next downlink subframe after the special subframe.

In some embodiments, if the number of repetitions of the NPDSCH is greater than one, the UE 102 may perform the de-puncture operation based on a puncture operation of the NPDSCH in symbol periods that correspond to the GP and the UpPTS.

In some embodiments, the special subframe may include 14 symbol periods. One or more of the downlink subframes may include 14 symbol periods. The UE 102 may receive first NRSs in a first plurality of symbol periods of the downlink subframes. The symbol periods of the downlink subframes may be indexed by 0-13, and the first plurality of symbol periods may be indexed by 5, 6, 12, and 13. The UE 102 may receive second NRSs in a second plurality of symbol periods of the DwPTS. The symbol periods of the DwPTS may be indexed by 0-13, and the second plurality of symbol periods may be indexed by 5, 6, 9, and 10.

In some embodiments, an apparatus of a UE 102 may comprise memory. The memory may be configurable to store at least a portion of a SIB1-NB. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to decoding of the SIB1-NB, the NPDCCH, and the NPDSCH. The apparatus may include a transceiver to receive the SIB1-NB, the NPDCCH, and the NPDSCH. The transceiver may transmit and/or receive other blocks, messages and/or other elements.

Figure 10A:
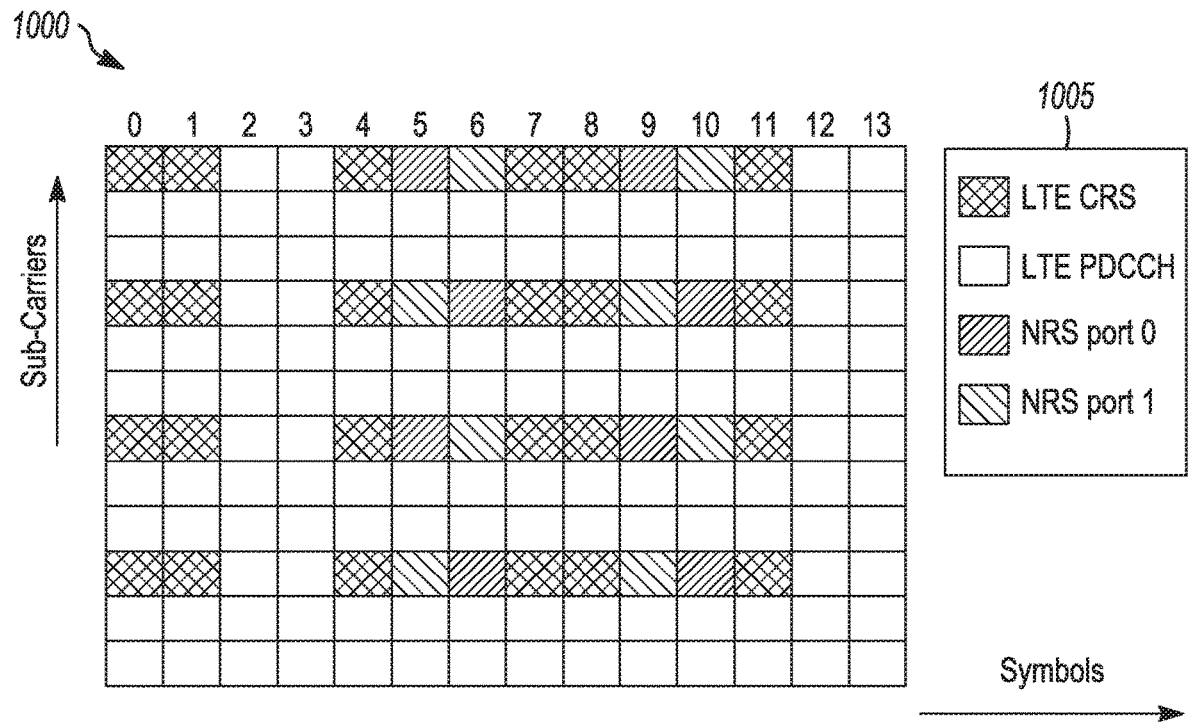
FIG. 10A, FIG. 10B, and FIG. 10C illustrate example configurations of the special subframe in accordance with some embodiments.
Figure 10B:
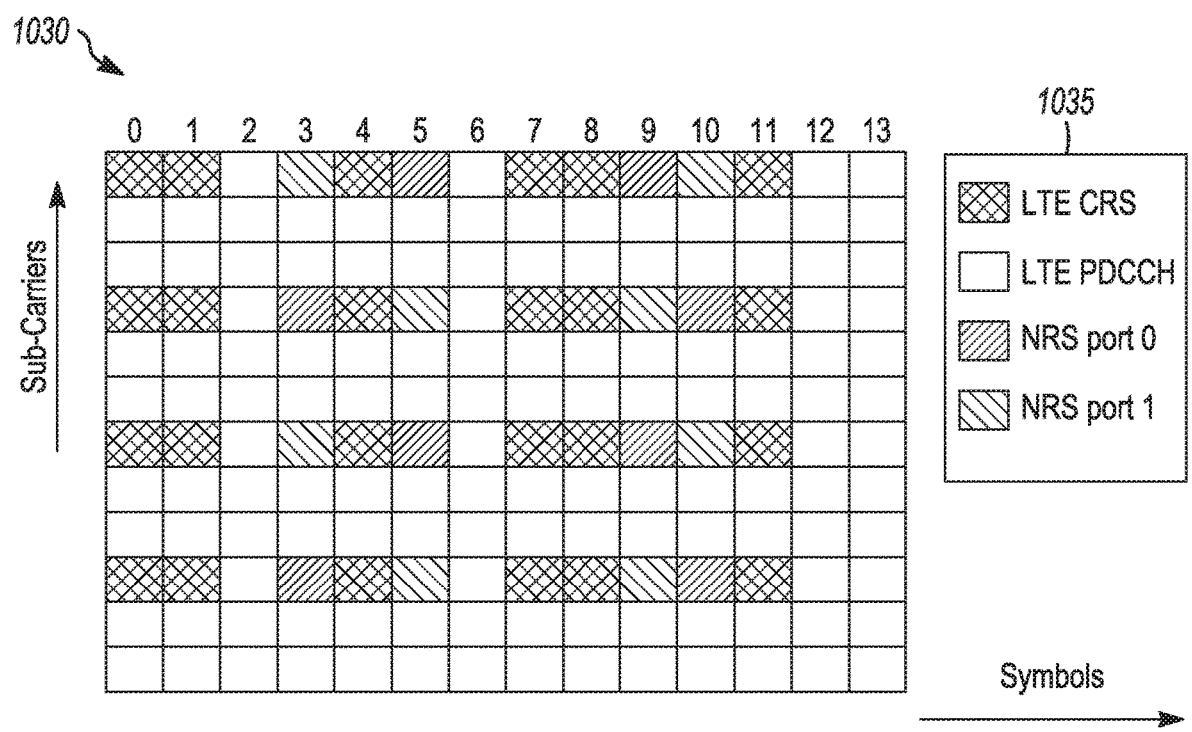
Figure 10C:
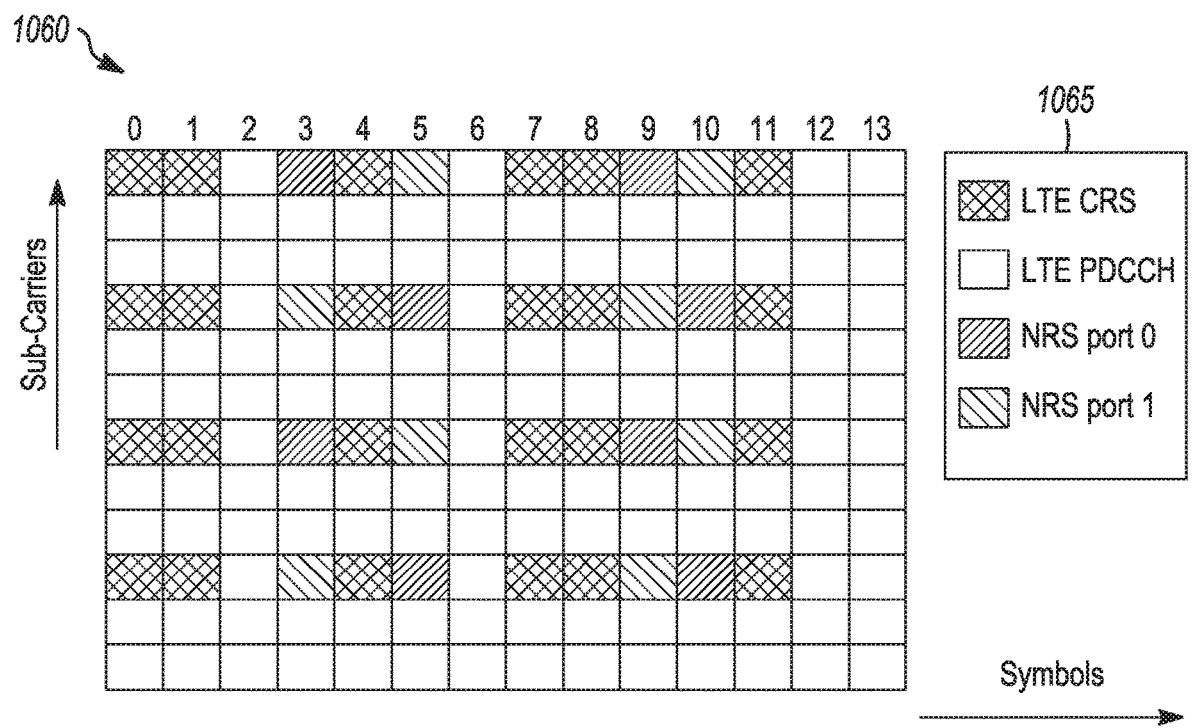

FIG. 10A, FIG. 10B and FIG. 10C illustrate example configurations of the special subframe in accordance with some embodiments. In references herein, "FIG. 10" may include FIG. 10A, FIG. 10B, and FIG. 10C. It should be noted that the examples shown in FIG. 10 may illustrate some or all of the concepts and techniques described herein in some cases, but embodiments are not limited by the examples. For instance, embodiments are not limited by the name, number, type, size, ordering, arrangement and/or other aspects of the frames, subframes, signals, time resources, frequency resources and other elements as shown in FIG. 10. Although some of the elements shown in the examples of FIG. 10 may be included in a 3GPP LTE standard, 5G standard, NR standard, feNB-IoT standard and/or other standard, embodiments are not limited to usage of such elements that are included in standards.

In some embodiments, TDD for in-band, guard-band, and standalone operation modes of NB-IoT may be supported. In some cases, UL compensation gaps may not necessarily be needed or used by the UE 102, although the scope of embodiments is not limited in this respect. In some embodiments, new TDD configuration(s) other than the TDD configurations in LTE for further enhanced narrowband internet-of-things (feNB-IoT) may be supported.

In some embodiments, a TDD configuration in legacy LTE may be signaled by SIB1. One or more TDD configurations (including but not limited to one or more of the 7 TDD configurations shown in the table below) may be used in a legacy LTE protocol and/or other protocol.

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Regarding the special subframe structure, a legacy LTE system may support one or more special subframe structures (including but not limited to one or more of the special subframe structures shown in the tables below). In the tables, X is the number of additional SC-FDMA symbols in UpPTS provided by the higher layer parameter srs-UpPtsAdd if configured, otherwise X is equal to 0. The UE is not expected to be configured with 2 additional UpPTS SC-FDMA symbols for special subframe configurations {3, 4, 7, 8} for normal cyclic prefix (CP) in downlink and special subframe configurations {2, 3, 5, 6} for extended CP in downlink, and 4 additional UpPTS SC-FDMA symbols for special subframe configurations {1, 2, 3, 4, 6, 7, 8} for normal CP in downlink and special subframe configurations {1, 2, 3, 5, 6} for extended CP in downlink.

| Special subframe configuration | Normal cyclic prefix in downlink | | |
|---|---|---|---|
| | DwPTS | UpPTS | |
| | | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ |
| 1 | $19760 \cdot T_s$ | | |
| 2 | $21952 \cdot T_s$ | | |
| 3 | $24144 \cdot T_s$ | | |
| 4 | $26336 \cdot T_s$ | | |
| 5 | $6592 \cdot T_s$ | $(2 + X) \cdot 2192 \cdot T_s$ | $(2 + X) \cdot 2560 \cdot T_s$ |
| 6 | $19760 \cdot T_s$ | | |
| 7 | $21952 \cdot T_s$ | | |
| 8 | $24144 \cdot T_s$ | | |
| 9 | $13168 \cdot T_s$ | | |
| 10 | $13168 \cdot T_s$ | $13152 \cdot T_s$ | $12800 \cdot T_s$ |

| Special subframe configuration | Extended cyclic prefix in downlink | | |
|---|---|---|---|
| | DwPTS | UpPTS | |
| | | Normal cyclic prefix in uplink | Extended cyclic prefix in uplink |
| 0 | $7680 \cdot T_s$ | $(1 + X) \cdot 2192 \cdot T_s$ | $(1 + X) \cdot 2560 \cdot T_s$ |
| 1 | $20480 \cdot T_s$ | | |
| 2 | $23040 \cdot T_s$ | | |
| 3 | $25600 \cdot T_s$ | | |
| 4 | $7680 \cdot T_s$ | $(2 + X) \cdot 2192 \cdot T_s$ | $(2 + X) \cdot 2560 \cdot T_s$ |
| 5 | $20480 \cdot T_s$ | | |
| 6 | $23040 \cdot T_s$ | | |
| 7 | $12800 \cdot T_s$ | | |
| 8 | $25600 \cdot T_s$ | | |
| 9 | — | — | — |
| 10 | — | — | — |

In some embodiments, a certain number of DL subframes may be needed and/or used for NPBCH, NPSS, NSSS and/or SIB transmissions. Thus, some TDD configurations with limited number of DL subframes may not work. On the other hand, with limited number of UL subframes, the UL performance and latency may be impacted. In some embodiments, including but not limited to the embodiments described below, one or more TDD configurations may be supported for feNB-IoT.

In some embodiments, TDD UL-DL configurations for which a number of DL subframes within one radio frame is less than 4 may not be supported for feNB-IoT. For instance, the TDD configurations labeled as 0 and 6 above may not be supported, in some embodiments.

In some embodiments, one or more TDD configurations (including but not limited to the configurations labeled as 3, 4 and 5 above) may be supported for feNB-IoT. Such configurations may have no less than 3 DL subframes excluding the possible MBSFN subframes (subframes #3, 4, 7, 8 and 9) in TDD systems. With these TDD configurations, subframe 0 may be used for NPBCH transmission, subframe 5 may be used for NPSS transmission, and subframe 6 may be used for NSSS and/or SIB1-NB transmissions, respectively.

It should be noted that the transmission periodicity of NSSS and SIB1-NB is 20 ms. Thus, in some examples, the NSSS and SIB1-NB may be TDMed, in the sense that SIB1-NB is transmitted in the subframe #N within the radio frame immediately after the radio frame with NSSS transmission on the same subframe #N. For instance, every even radio frame has an NSSS transmission while every odd radio frame has a SIB1-NB transmission, and N may be 6 with TDD configurations 3, 4 and 5. In a non-limiting example, TDD configurations 3 and 4 may be supported for TDD feNB-IoT, since the TDD configuration 5 has only 1 UL subframe which may result in UL performance degradation.

In some embodiments, the TDD UL-DL configurations with 2 back-to-back UL subframes are supported, while the TDD configurations without any occurrence of two continuous UL subframes are not supported. This may better facilitate the transmission of NPUSCH format 2 with RU of 2 ms for 15 kHz subcarrier spacing. Within the constraint of 2 continuous UL subframes, TDD configurations 2 and 5 are not supported.

In some embodiments, certain TDD configurations with limited number of UL subframes may be excluded. In a non-limiting example, TDD configuration 5 may not necessarily be supported. In another non-limiting example, TDD configurations 2, 4 and 5 may not necessarily be supported.

In other words, the supported TDD configurations may be configurations 0-4 and 6, or configurations 0, 1, 3 and 6.

In some embodiments, there may be only 2 DL subframes in configuration 0. To fit in the NPSS, NSSS, MIB-NB and SIB1-NB transmissions, the following methods may be considered. In some embodiments. The NPBCH/NPSS/NSSS/SIB1-NB may be transmitted in different NB-IoT carriers, all existing TDD configurations may be supported, with subframes #0 and #5 allocated for NPBCH/NPSS/NSSS/SIB1-NB. In some embodiments, NPBCH/NPSS/NSSS/SIB1-NB may be transmitted in the special subframe, which is described herein. For example, NPBCH is transmitted in subframe 0, while NSSS and SIB1-NB are transmitted in subframe 5 (in alternative radio frames). The NPSS may be transmitted in DwPTS in subframe 1.

In some embodiments, other TDD configurations may be used. For example, {D, D, D, D, D, D, S, U, U, U}, (D, D, D, D, D, D, D, S, U, U} and/or {D, D, D, D, D, D, D, D, S, U} may be supported for feNB-IoT. For example, such TDD configurations may be supported in standalone operation mode. In some embodiments, the dynamic TDD configurations reusing techniques in eIMTA may be used.

In some embodiments, the TDD configuration may be indicated by SIB1-NB. In some embodiments, the TDD configuration may be indicated by reserved bits in MIB-NB. In some embodiments, the TDD configuration may be indicated in other S1 messages, e.g. SIB2-NB or other SIBs. In embodiments, in which dynamic TDD configuration is supported for feNB-IoT, similar to eIMTA, two reference configurations (i.e., UL-reference configuration and DL-reference configuration) may be indicated, with the set of UL subframes in DL-reference configuration being a subset of UL subframes in UL-reference configuration. The UL-reference configuration may be indicated by SIB1-NB or MIB-NB, while the DL-reference configuration is RRC configured. The configuration of DL-reference configuration may be cell-specific or UE-specific. The actual dynamic TDD configuration is indicated by DCI. A new DCI format may be introduced, based on the design of DCI format N1 or N2, and may be scrambled by a new RNTI, e.g. eIMTA-RNTI.

In some embodiments, the special subframe configurations listed in the table above are supported for feNB-IoT. In some embodiments, a supported cell size may not be up to 100 km for TDD feNB-IoT cell and thus the needed gap duration does not need to be very large. Recall that NPRACH in Rel-13 NB-IoT has CP of 266.67 and 66.7 us. In examples where feNB-IoT TDD cells have the similar size as the Rel-13 NB-IoT cell, the gap duration may be similar to NPRACH CP length. Thus, the supported special subframe configurations may be configurations 1, 2, 3, 4, 6, 7, 8, and/or 10. In one example of this embodiment, only configurations 6-8 are supported, which have UpPTS duration of 2 symbols. This may be used in embodiments where UpPTS may be used for UL transmission.

In some embodiments, recalling that SRS is not supported in NB-IoT, to maximize the use of special subframe, only the special subframe configurations with longer DwPTS duration may be supported for feNB-IoT TDD cells. For example, the supported special subframe configurations may be only configuration 4, or configurations 3, 4 and 8, or configurations 2, 3, 4, 7 and 8. This may be used in the embodiments where UpPTS is not used for UL transmissions for feNB-IoT TDD systems. As another example, only the special subframe configurations with number symbols in DwPTS no less than X are supported, where X is a positive integer that may be predefined or configured by higher layer signaling. For example, X may be 7 to make sure at least one set of NRS presents.

In some embodiments, for cases in which the configured special subframe structure is not the one supported by feNB-IoT UEs 102 (such as in-band operation mode and/or other mode), the following method may be considered. In some embodiments, the UE 102 may ignore the special subframe. The UE 102 may consider them as invalid DL/UL subframes. In some embodiments, the eNB 104 may indicate the special subframe as invalid DL/UL subframes.

In some embodiments, different special subframe configurations may be supported in different TDD configurations. For example, for TDD configurations with limited number of DL subframes (including but not limited to TDD configurations 0 and 6), the supported special subframe configurations for feNB-IoT may be the configurations with DwPTS larger than duration of X. As another example, for TDD configurations with limited number of UL subframes (including but not limited to TDD configurations 2, 4 and 5), the supported special subframe configurations for feNB-IoT may be the configurations with UpPTS larger than duration Y, where Y is a positive integer that may be predefined or configured by higher layer signaling, e.g. only special subframe configurations 5-8 and/or 10 are supported.

In some embodiments, 40 µs switching time for both DL-to-UL and UL-to-DL switching on one NB-IoT carrier may be needed. Thus, in certain cases with very short GP durations, there may not be sufficient switching time for DL-to-UL transition in case a UE needs to receive on the DL in the DwPTS region and also transmit in the UpPTS region of the same special subframe. In some embodiments, the special subframe configurations #4 and #8, which have a 1-symbol GP duration, may not necessarily be supported in TDD NB-IoT. Alternatively, if the special subframe configurations #4 and #8 are configured, the following options may be defined. The options given below are not exhaustive. Other options are possible.

In one option, either DwPTS or UpPTS, or none of them are used for DL/UL transmissions. For example, it is up to scheduling to handle the switching time. When UpPTS is configured/specified as NPRACH resources, no DL transmission would be scheduled during DwPTS whose following UpPTS may be used for UL (e.g. NPRACH) transmission. As another example, the UpPTS is not configured/specified for UL transmission, then DwPTS may be scheduled for DL transmission. In yet another example, neither DwPTS is scheduled for DL transmission nor UpPTS is configured for UL transmission.

In another option, the DwPTS may be used for DL transmission and UpPTS may be used for UL transmission in the same special subframe, and the last symbol of DwPTS is punctured to reserve sufficient time for DL/UL switching. This may be achieved in two ways. In one approach, the eNB transmits DL physical channels or signals in the DwPTS such that the physical channel or signal is mapped to the REs in the last symbol of the UpPTS but are not transmitted. In another approach, it is specified that in case the GP duration is not sufficient to accommodate the DL-to-UL switching time, the UE may skip reception on the last symbol of the DwPTS (i.e., independent of the actual occurrence of DL transmission in the last symbol of the DwPTS by the eNB).

In another option, the DwPTS may be used for DL transmission and UpPTS may be used for UL transmission in the same special subframe, and the first symbol of UpPTS is punctured to reserve sufficient time. In other words, the UE transmits UL channels or signals in the UpPTS such that the physical channel or signal is mapped to the REs in the first symbol of the UpPTS but are not transmitted.

In another option, it may be specified that the UE 102 does not expect an UL transmission following a NPDCCH or NPDSCH reception with less than X us gap between them, where X≥40.

In another option, it may be specified that the UE 102 does not expect a DL transmission before a configured/scheduled UL transmission with less than X us gap between them, where X≥40.

In some embodiments, for TDD NB-IoT, the UL-DL frame timing is defined such that transmission of the uplink radio frame number i from the UE 102 starts $(N_{TA}+N_{TA\ offset}) \times T_s$ seconds before the start of the corresponding downlink radio frame at the UE 102, wherein $N_{TA\ offset}$ is such that $N_{TA\ offset} * T_s \geq 40$ us and $N_{TA}$ corresponds to the timing advance value indicated to the UE 102. As non-limiting examples, $N_{TA\ offset}=1248$ or $N_{TA\ offset}=1230$.

In some embodiments, a method for the indication of special subframe configurations may be similar to the indication method for TDD configuration, although the scope of embodiments is not limited in this respect. For instance, the following embodiments may be considered. In some embodiments, the special subframe configuration may be indicated by SIB1-NB. In some embodiments, the special subframe configuration may be indicated by reserved bits in MIB-NB. In some embodiments, the special subframe configuration may be indicated in other S1 messages, e.g. SIB2-NB or other SIBs. In some embodiments, the special subframe configuration may be indicated by DCI. For example, a mechanism similar to SPS mechanism may be considered, where the DCI scrambled by a new RNTI, e.g. called TDD-RNTI, may be used for activation and release of a certain special subframe configuration. The DCI design may be based on existing DCI formats for NB-IoT, e.g. DCI formats N0, N1 or N2, with certain bits reinterpreted for special subframe configurations and remaining bits used for validation. It should be noted that if there is only one special subframe configuration supported for feNB-IoT, then the indication may not be necessary, in some cases.

In some embodiments, the special subframe may be defined as invalid DL and invalid UL subframe for NB-IoT UEs 102. And NB-IoT transmissions may not occur on special subframes, in some cases.

In some embodiments, the special subframe may be configured as valid DL subframe, or may be configured to support DL transmission during DwPTS region. In this case, the DL transmission may occur in the special subframe. Denote by M the number of symbols during DwPTS minus Y (e.g., Y=3 to preclude the legacy control region for all operation modes, or Y=3 for in-band and Y=0 for stand-alone/guard-band operation modes).

In some embodiments, NPSS may be transmitted on the special subframe. To extend the NPSS symbols to be transmitted on the special subframe, the following method may be considered. It should be noted that these options may be used for cases where NPSS is transmitted in another subframe, and the additional transmission on DwPTS is for further performance improvement, although the scope of embodiments is not limited in this respect. In addition, it may be used in cases where DwPTS is the only time domain resources for NPSS transmission. In the latter case, the synchronization performance may be impacted due to less number of NPSS symbols compared to Rel-13 NB-IoT.

In some embodiments, a same ZC sequence may be used and repeated M times. In some embodiments, a length-M cover code with low cross-correlation with existing length-11 cover code is used. In one example, the cover code may be a complex number, e.g., based on QPSK comprising+1, +j, −1, −j. Alternatively, the cover code may be based on BSPK comprising+1, −1. In another example, the cover code for any M symbols of an NPSS of an LTE standard (including but not limited to Rel-13) may be applied to the NPSS transmitted during DwPTS. In some embodiments, a new NPSS sequence repeated over the M symbols may be introduced. For example, a ZC sequence with length 11 and root index 6 may be used. This sequence may be the complex conjugate sequence of an NPSS used in a Rel-13 LTE standard) and thus may help reduce some complexity, in some cases. In some embodiments, any portion of an existing NPSS may be copied to M symbols. The copied level may be OFDM symbol granularity. For example, copy the last M NPSS symbols to DwPTS symbols or copy the first M NPSS symbols to DwPTS symbols.

In a non-limiting example, the value of M may be 9, by only supporting the special subframe configuration with 12 symbols in DwPTS. Alternatively, M may be 8 by supporting special subframe configurations with at least 11 symbols in DwPTS. As another example, M may be 7 or 6 by supporting special subframe configurations with at least 10 or 9 symbols in DwPTS region, respectively. In a non-limiting example, NSSS may be transmitted on the special subframe.

To extend the NSSS symbols to be transmitted on the special subframe, the following method may be considered. It should be noted that these options may be used for cases where NSSS is transmitted in another subframe, and the additional transmission on DwPTS is for further performance improvement, although the scope of embodiments is not limited in this respect. In some embodiments, any portion of an existing NSSS may be copied to the M symbols. In some embodiments, the copied level may be OFDM symbol granularity. For example, a current NSSS may be extended to length 132+12M via cyclic extension. The extended part (i.e. length-12M symbols) are mapped to M symbols. The time domain cyclic shift of an NSSS (including but not limited to an NSSS used in LTE Rel-13) may be applied to the M symbols, in some cases.

In some embodiments, any M symbols of an NSSS (including but not limited to an NSSS used in LTE Rel-13) may be copied to the DwPTS. In some embodiments, a new sequence may be introduced for NSSS in DwPTS. For example, a length-K ZC sequence may be used, with cyclic extension to length-12M to fit into the M symbols, where K is the largest prime number that is no more than 12M. The sequence may depend on cell ID, e.g. the root index of the length-K sequence may be mod(Cell ID, K).

In a non-limiting example, the NPBCH may be transmitted on the special subframe.

To extend the NPBCH symbols to be transmitted on the special subframe, the following methods may be considered. It should be noted that these options may be used for cases where NPBCH is transmitted in another subframe, and the additional transmission on DwPTS is for further performance improvement, although the scope of embodiments is not limited in this respect.

In some embodiments, any symbols of an NPBCH (including but not limited to an NPBCH of LTE Re-13) may be repeated in the M symbols. For example, the Rel-13 NPBCH in symbols #3 to #2+M may be copied to DwPTS symbols #3 to #2+M, i.e. the remaining 11-M NPBH symbols are punctured in this example. In some cases, this may facilitate frequency offset tracking based on estimation of the phase ramp between each pair of repeated symbols, if the channel coherence time is larger than the duration between the subframe 0 and the special subframe.

In some embodiments, a rate matching method for NPBCH may be changed, taking into account M more symbols, in cases where the special subframe is the next subframe following the NPBCH subframe. In a non-limiting example, the NPDSCH may be transmitted on the special subframe. One or more of the following options are possible, although embodiments are not limited to just these options. In option #1, any M symbols out of the next valid DL subframe carrying NPDSCH may be copied to the DwPTS. In option #2, any M symbols out of the previous valid DL subframe carrying NPDSCH may be copied to the DwPTS. In option #3, the TBS carried by the previous or next valid DL subframe carrying NPDSCH may be rate matched to M more symbols and the additional bits are carried by the M symbols in DwPTS. In option #4, based on the scheduling, the NPDSCH may be transmitted over the DwPTS. Different from other valid DL subframes, the scheduled TBS may be rate matched to M symbols. Alternatively, the rate matching may be the same as other valid DL subframes, with the symbols corresponding to the GP and UpPTS duration punctured.

In some embodiments, one or more of the above options may be used for NPDSCH with and without repetitions, e.g. option #1 above or option #2 above may be used when NPDSCH has number of repetitions larger than 1, e.g., by copying the first M symbols and puncturing the remaining ones, while option #4 with rate matching to M symbols may be used when there is no repetition. Alternatively, the same option may be used regardless of the number of repetitions scheduled for NPDSCH. e.g. using same rate matching as other valid full DL subframe and puncturing the symbols corresponding to GP and UpPTS.

In a non-limiting example, only SIB1-NB may be transmitted during the DwPTS. Alternatively, only unicast PDSCH may be transmitted during DwPTS. In some embodiments, the NPDSCH transmission during the DwPTS may be counted as one repetition, i.e. there are (n−1) more repetitions if n is the number of indicated repetitions. Alternatively, the NPDSCH transmission during the DwPTS may be excluded and not counted as one of the indicated repetitions. In a non-limiting example, higher layer signaling may be used to indicate whether the DwPTS is used for the DL transmission. Alternatively, DwPTS is always used for the DL transmission occurs next to it (e.g. for the DL transmission prior to it).

In a non-limiting example, the transmission during DwPTS is not counted in the number of scheduled repetitions indicated by DCI. In other words, denoting the number of repetitions indicated by DCI by R, the total transmission duration of NPDSCH is R repetitions plus the DwPTS regions, if there are DwPTS regions in the middle of the NPDSCH transmission. In cases in which DwPTS is used for DL transmission occurs prior to it, even when the NPDSCH transmission ends at the subframe prior to DwPTS. DwPTS may be additionally used for NPDSCH transmission. Alternatively. DwPTS will not be used for NPDSCH if it is after the end of NPDSCH transmission. In another non-limiting example, the transmission during DwPTS is counted in the number of scheduled repetitions indicated by DCI. DwPTS will not be used for NPDSCH if it is after the end of NPDSCH transmission.

In another non-limiting example, the NPDSCH may be transmitted during DwPTS only when it has no repetition or $N_{SF}=1$. For NPDSCH during DwPTS without repetition, the TBS may be determined following PDSCH transmission during DwPTS in LTE, e.g. by scaling the TBS or $N_{SF}$ used to determine the TBS by $N_{SF}=\max(\text{floor}(N'_{SF}*0.375),1)$ for special configuration 9 with normal CP and configuration 7 with extended CP, and $N_{SF}=\max(\text{floor}(N'_{SF}*0.75),1)$ for other special configurations (including but not limited to configurations used in LTE).

In some embodiments, as the NRS locates at symbols #5, 6, 12 and 13, for NPDSCH transmission in DwPTS, the performance may be degraded due to less available NRS symbols in DwPTS (e.g. the last two symbols may not be used for NPDSCH). To compensate the performance loss, one or more of the following options may be used. In option #1, the NPDSCH may be sent in DwPTS only when it has repetitions, and relying on the cross-SF channel estimation. The performance loss may be quite small, in some cases. In option #2, the last one or two NRS symbols may be moved to other symbols, e.g. symbol 9 and/or 10. Alternatively, the NRS symbols may be shifted to other symbols, and different NRS symbols may be defined for different special subframe configurations. For example, besides the changes of last one or two NRS symbols, the NRS symbol on symbol 6 may be shifted to symbol 3.

Referring to FIG. 10, example formats 1000, 1030, 1060 are shown. In some embodiments, the format shown in 1000 may be applied to DwPTS with no more than 7 symbols (for example, special subframe configurations #1, 2, 3, 4, 6, 7 and 8), although the scope of embodiments is not limited in this respect. In some embodiments, the format shown in 1030 may be applied to DwPTS with more than 3 symbols (for example, special subframe configurations #1, 2, 3, 4, 6, 7, 8 and 10), although the scope of embodiments is not limited in this respect. In some embodiments, the format shown in 1030 may be applied to special subframe configuration #10 if PDSCH is supported in this special subframe, although the scope of embodiments is not limited in this respect. In some embodiments, the NRS on symbols 12 and/or 13 in FDD NB-IoT may be shifted to symbols 9 and/or 10, respectively. In some embodiments, the NRS on symbol 6 in FDD NB-IoT may be shifted to symbol 3. In some embodiments, the NRS on symbols 5 and 6 in FDD NB-IoT may be shifted to symbols 3 and 5, respectively. Non-limiting examples of such shifts are shown in 1030, 1060.

In some embodiments, an NRS density may be increased. In some embodiments, additional NRS symbols may be transmitted in symbols #3, 9, and/or 10.

In a non-limiting example, one or more of the above embodiments are applied to all special subframe configurations. Alternatively, they may be used for certain special subframe configurations, e.g. when the DwPTS has no less than X symbols, e.g. X may be 12 or 9 or 6 symbols. As another example, this is configured by RRC signaling and/or indicated by DCI.

In a non-limiting example NPDCCH may be transmitted on the special subframe during DwPTS region. One or more of the following options may be considered. In option #1, any M symbols out of the next valid DL subframe carrying NPDCCH may be copied to the DwPTS. In option #2, any M symbols out of the previous valid DL subframe carrying NPDCCH may be copied to the DwPTS. In option #3, the DCI carried by the previous or next valid DL subframe carrying NPDCCH may be rate matched to M more symbols and the additional bits are carried by the M symbols in DwPTS. In option #4, the rate matching may be the same as other valid DL subframes carrying NPDCCH, with the symbols corresponding to the GP and UpPTS duration punctured.

In some embodiments, one or more of the above options (and/or other options) may be used for NPDCCH with and without repetitions, e.g. option #1 or option #2 may be used when NPDCCH has number of repetitions larger than 1, e.g., by copying the first M symbols and puncturing the remaining ones, while option #4 with rate matching to M symbols may be used when there is no repetition. Alternatively, the same option may be used regardless of the number of repetitions scheduled for NPDCCH, e.g. using same rate matching as other valid full DL subframe and puncturing the symbols corresponding to GP and UpPTS.

In some embodiments, in the above options, the NPDCCH transmission during the DwPTS may be counted as one repetition, i.e. there are n−1 more repetitions if n is the number of indicated repetitions. Alternatively, the NPDCCH transmission during the DwPTS may be excluded and not counted as one of the indicated repetitions. In a non-limiting example, the higher layer signaling may be used to indicate whether the DwPTS is used for the DL transmission. Alternatively. DwPTS may be used for the DL transmission occurs next to it (e.g. for the NPDCCH prior to it).

In another non-limiting example, the transmission during DwPTS is not counted in the number of scheduled repetitions indicated by DCI. In other words, denoting R the number of repetitions for NPDCCH indicated by DCI, the total transmission duration of NPDCCH is R repetitions plus the DwPTS regions, if there are DwPTS regions in the middle of the NPDCCH transmission. In examples where DwPTS is used for DL transmission occurs prior to it, even when the NPDCCH transmission ends at the subframe prior to DwPTS, DwPTS may be additionally used for NPDCCH transmission. Alternatively, DwPTS will not be used for NPDCCH if it is after the end of NPDSCH transmission.

In another non-limiting example, the transmission during DwPTS is counted in the number of scheduled repetitions for NPDCCH indicated by DCI. DwPTS will not be used for NPDCCH if it is after the end of NPDCCH transmission. In another non-limiting example, the NPDCCH transmission may be supported during DwPTS only when it has no repetition.

In some embodiments, in cases in which the DwPTS is used for NPDCCH transmission, and it is the end of the NPDCCH transmission, the timing relationship and scheduling delay may be with respect to the end of the special subframe. In a non-limiting example, only NPDCCH with AL=2 may be transmitted during DwPTS. Alternatively, both AL=1 and AL=2 may be supported in DwPTS when the number of NPDCCH repetitions is 1 (i.e., no repetitions case). In some embodiments, the NPDCCH may be transmitted using the DwPTS only for NPDCCH candidates with repetitions, i.e., number of repetition greater than 1. In some embodiments, similar to the NRS transmission for NPDSCH in DwPTS, the embodiments there may be applied when NPDCCH is transmitted in DwPTS as well.

In some embodiments, the special subframe may be configured as valid UL subframe. In one example, the special subframe may be configured as both valid DL and valid UL subframes, but the DL transmission may only occur during DwPTS region while the UL transmission may only occur during the UpPTS region. Alternatively, the special subframe is neither configured as valid DL or valid UL subframes, but feNB-IoT UE is allowed to perform DL transmission during DwPTS and/or UL transmission during UpPTS.

In cases in which the UL transmission may occur in the special subframe, the following UL transmissions may be supported. In some embodiments, the NPRACH may be transmitted during the UpPTS. One or more of the following options (and/or other options) may be used. In one option, the following UL subframe is configured for NPRACH transmission. The CP for the following NPRACH transmission is extended to fill in the UpPTS region. In another option, the NPRACH transmission starts from UpPTS region, and may continue across the following UL subframes. In another option, any portion of a NPRACH transmission may be copied to the UpPTS duration.

In a non-limiting example, the NPUSCH may be transmitted during UpPTS. One or more of the following options (and/or other options) may be used. In option #1, any M symbols out of the next valid UL subframe carrying NPUSCH may be copied to the UpPTS. In option #2, any M symbols out of the previous valid UL subframe carrying NPUSCH may be copied to the UpPTS. In option #3, the TBS carried by the previous or next valid UL subframe carrying NPUSCH may be rate matched to M more symbols and the additional bits are carried by the M symbols in UpPTS. In option #4, based on the scheduling, the NPUSCH may be transmitted over the UpPTS. Different from other valid UL subframes, the scheduled TBS may be rate matched to M symbols. Alternatively, the rate matching may be the same as other valid UL subframes, with the symbols on the GP and UpPTS duration punctured.

In some embodiments, one or more of the above options (and/or other options) may be used for NPUSCH with and without repetitions, e.g. option #1 or option #2 may be used when NPUSCH has number of repetitions larger than 1. e.g., by copying the first M symbols and puncturing the remaining ones, while option #4 with rate matching to M symbols may be used when there is no repetition. Alternatively, the same option may be used regardless of the number of repetitions scheduled for NPUSCH. e.g. using same rate matching as other valid full UL subframe and puncturing the symbols corresponding to DwPTS and GP.

In some embodiments, only UL control information (i.e. NPUSCH format 2) may be transmitted during the UpPTS.

In a non-limiting example, only NPUSCH format 1 with multi-tone transmission is supported during the UpPTS to have a low code rate. For example, only 6-tone or 12-tone NPUSCH transmission is supported in UpPTS. Alternatively, any multi-tone NPUSCH transmissions may be supported in UpPTS, while single-tone NPUSCH format 1 and/or format 2 is not supported in UpPTS. In some embodiments, the NPUSCH transmission during the UpPTS may be counted as one repetition, i.e. there are n−1 more repetitions if n is the number of indicated repetitions. Alternatively, the NPUSCH transmission during UpPTS may be excluded and not counted as one of the indicated repetitions.

In a non-limiting example, higher layer signaling may be used to indicate whether the UpPTS is used for the UL transmission. Alternatively, UpPTS may be used for the UL transmission occurs next to it (e.g. for the UL transmission following it).

In a non-limiting example, the transmission during UpPTS is not counted in the number of scheduled repetitions indicated by UL grant. In other words, denoting the number of repetitions indicated by DCI by R, the total transmission duration of NPUSCH is R repetitions plus the UpPTS regions, which are in the middle of the NPUSCH transmission and/or immediately prior to NPUSCH transmission. In some cases in which UpPTS is used for UL transmission immediately following the UpPTS, as long as the start of UpPTS meet the timing relationship between the end of DCI and start of NPUSCH transmission, UpPTS may be additionally used for NPUSCH transmission even it is before the start of NPUSCH transmission. Alternatively. UpPTS will not be used for NPUSCH if it is before the start of NPDSCH transmission, but may be used when it is in the middle of a NPUSCH transmission.

In another non-limiting example, the transmission during UpPTS is counted in the number of scheduled repetitions indicated by DCI. UpPTS will not be used for NPUSCH if it is before the start of the scheduled NPUSCH transmission. In another non-limiting example, NPUSCH during UpPTS is supported only when NPUSCH has no repetition.

In some embodiments, for NPUSCH during UpPTS without repetition, the TBS may be determined following PDSCH transmission during DwPTS in LTE. e.g. by scaling the indicated TBS or number of RUs used to determine the TBS. e.g. $N_{RU}=\max(\text{floor}(N'_{RU}*0.375),1)$ for certain special configurations (e.g. #9 with normal CP and configuration #7 with extended CP), and $N_{RU}=\max(\text{floor}(N'_{RU}*0.75), 1)$ for other special configurations, including but not limited to configurations included in an LTE protocol.

In some cases, including but not limited to cases in which DwPTS is used for NPSS/NSSS, the UE 102 may blindly detect the potential NPSS/NSSS transmissions during DwPTS. In some cases, including but not limited to cases in which DwPTS is used for NPBCH, if TDD/FDD detection may be done based on NPSS/NSSS detection, the UEs 102 may know if it is a TDD system. In cases in which the DwPTS duration is fixed, the UEs 102 may know which symbols are used for NPBCH transmission during DwPTS. On the other hand, if there are multiple possible DwPTS durations, the UEs 102 may blindly detect which symbols during DwPTS are used for NPBCH transmission.

In some embodiments, for some cases in which DwPTS is used for NPDSCH, if SIB1-NB is transmitted during DwPTS, one of the following examples may be applicable. In a non-limiting example, the UEs 102 may blindly detect which set of DwPTS symbols are used for SIB1-NB transmission if the special subframe configuration is indicated by SIB1-NB or other SI messages. In another non-limiting example, a number of symbols that may be used in DwPTS for SIB1-NB is predefined. In some embodiments, the DwPTS may have at least these symbols. The DwPTS should have at least these symbols, in some embodiments. In another non-limiting example, the number of symbols in DwPTS may be indicated by MIB-NB using spare bits. For example, 3 bits may be used in MIB-NB to indicate the DwPTS structure, e.g. from existing special subframe configurations {1-4, 6-9} or {1-4, 6-8}. As another example, 2 bits may be used in MIB-NB to indicate the special subframe configurations from set {3, 4, 7, 8} or to indicate the number of symbols within DwPTS from set {9, 10, 11, 12}. Alternatively, 1 bits may be used in MIB-NB to indicate the number of symbols in DwPTS, e.g. from any set of {9, 10, 11, 12} with two elements such as {9, 11} or {10, 11} or {11, 12}.

In some embodiments, the UEs 102 may know the TDD and special subframe configurations and thus UEs 102 may directly decode the NPDSCH, e.g. for NPDSCH carrying DL transmission other than SIB1-NB. In some cases, including but not limited to cases in which UpPTS is used for UL transmissions, the UEs 102 may already know the TDD and special subframe configuration, and thus may know which set of symbols may be used for UL transmissions.

In Example 1, an apparatus of a User Equipment (UE) may comprise memory. The apparatus may further comprise processing circuitry. The processing circuitry may be configured to decode a system information block type-1 narrowband (SIB1-NB) that indicates a subframe configuration for a radio frame configured for time-division duplexing (TDD) operation. The subframe configuration may comprise: one or more downlink subframes, one or more uplink subframes, and a special subframe that occurs immediately after one of the downlink subframes and immediately before one of the uplink subframes. The special subframe may comprise a downlink portion (DwPTS), a guard period (GP), and an uplink portion (UpPTS). The processing circuitry may be further configured to decode a narrowband physical downlink control channel (NPDCCH) that indicates a number of repetitions of a narrowband physical downlink shared channel (NPDSCH) sent at least partly in the special subframe. The processing circuitry may be further configured to, if the number of repetitions is greater than one, decode the NPDSCH based on a de-puncture operation for the special subframe. The processing circuitry may be further configured to, if the number of repetitions is equal to one, decode the NPDSCH based on a rate match operation for the special subframe. The memory may be configured to store at least a portion of the SIB1-NB.

In Example 2, the subject matter of Example 1, wherein the processing circuitry may be further configured to, if the number of repetitions is greater than one: perform the de-puncture operation based on a puncture operation of the NPDSCH in symbol periods that correspond to the GP and the UpPTS.

In Example 3, the subject matter of one or any combination of Examples 1-2, wherein the processing circuitry may be further configured to, if the number of repetitions is equal to one: decode the NPDSCH in the special subframe based on a rate match to the symbol periods of the DwPTS.

In Example 4, the subject matter of one or any combination of Examples 1-3, wherein the processing circuitry may be further configured to, if the number of repetitions is greater than one: decode the NPDSCH based on a puncture of the GP and UpPTS symbols. The processing circuitry may be further configured to, if the number of repetitions is equal to one: decode the NPDSCH based on a rate match operation for the special subframe. The rate match operation may be based on a number of symbol periods of the DwPTS.

In Example 5, the subject matter of one or any combination of Examples 1-4, wherein the special subframe and the downlink subframes may include 14 symbol periods. The processing circuitry may be further configured to, decode first narrowband reference signals (NRSs) in a first plurality of symbol periods of the downlink subframes. The symbol periods of the downlink subframes may be indexed by 0-13, and the first plurality of symbol periods may be indexed by 5, 6, 12, and 13. The processing circuitry may be further configured to decode second NRSs in a second plurality of symbol periods of the DwPTS. The symbol periods of the DwPTS may be indexed by 0-13, and the second plurality of symbol periods may be indexed by 5, 6, 9, and 10.

In Example 6, the subject matter of one or any combination of Examples 1-5, wherein the uplink subframes may be allocated for uplink transmissions, the downlink subframes may be allocated for downlink transmissions, and the special subframe may be allocated to enable a transition between the downlink transmissions and the uplink transmissions.

In Example 7, the subject matter of one or any combination of Examples 1-6, wherein the NPDCCH may be configurable to indicate one or more symbol periods for the NPDSCH. The one or more symbol periods may include one or more downlink subframes and/or the special subframe.

In Example 8, the subject matter of one or any combination of Examples 1-7, wherein if the one or more symbol periods for the NPDSCH includes the special subframe, the number of repetitions may include the NPDSCH received in the DwPTS.

In Example 9, the subject matter of one or any combination of Examples 1-8, wherein the UE may be arranged to operate in accordance with a further enhanced narrowband internet-of-things (feNB-IoT) protocol.

In Example 10, the subject matter of one or any combination of Examples 1-9, wherein the apparatus may further include a transceiver to receive the SIB1-NB, the NPDCCH, and the NPDSCH.

In Example 11, the subject matter of one or any combination of Examples 1-10, wherein the processing circuitry may include a baseband processor to decode the SIB1-NB, the NPDCCH, and the NPDSCH.

In Example 12, a computer-readable storage medium may store instructions for execution by one or more processors to perform operations for communication by a generation Node-B (gNB). The operations may configure the one or more processors to encode a narrowband physical downlink control channel (NPDCCH) for transmission in a special subframe of a radio frame. The radio frame may be configured for time-division duplexing (TDD) operation. The special subframe may occur immediately after a downlink subframe of the radio frame and immediately before an uplink subframe of the radio frame. The special subframe may include a downlink portion (DwPTS), followed by a guard period (GP), followed by an uplink portion (UpPTS). The operations may further configure the one or more processors to, if a number of repetitions of the NPDCCH is greater than one: puncture the NPDCCH for transmission in the DwPTS in accordance with a rate match for the downlink subframe. The NPDCCH may be punctured in symbol periods of the GP and the UpPTS. The operations may further configure the one or more processors to, if the number of repetitions of the NPDCCH is equal to one: rate match the NPDCCH for transmission in the DwPTS.

In Example 13, the subject matter of Example 12, wherein the operations may further configure the one or more processors to determine the number of repetitions of the NPDCCH based at least partly on a target decoding performance level at a User Equipment (UE).

In Example 14, an apparatus of a generation Node-B (gNB) may comprise memory. The apparatus may further comprise processing circuitry. The processing circuitry may be configured to determine a number of repetitions to be used for transmission of a narrowband physical downlink shared channel (NPDSCH) in accordance with a further enhanced narrowband internet-of-things (feNB-IoT) technique in a radio frame. The radio frame may be configured for time-division duplexing (TDD) operation. The radio frame may comprise subframes, including: one or more uplink subframes, one or more downlink subframes, and a special subframe. The special subframe may occur immediately after one of the downlink subframes and immediately before one of the uplink subframes. The special subframe may include a downlink portion (DwPTS), followed by a guard period (GP), followed by an uplink portion (UpPTS). The processing circuitry may be further configured to select one or more subframes for the transmission of the NPDSCH.

The processing circuitry may be further configured to, if the number of repetitions is greater than one, and if the special subframe is selected for the transmission of the NPDSCH: encode the NPDSCH based on a number of symbol periods of the special subframe; and puncture the NPDSCH for transmission in the DwPTS. The NPDSCH may be punctured in symbol periods that correspond to the GP and UpPTS. The memory may be configured to store the NPDSCH.

In Example 15, the subject matter of Example 14, wherein the processing circuitry may be further configured to, if the number of repetitions is greater than one, and if the special subframe and a downlink subframe immediately before the special subframe are selected for the transmission of the NPDSCH: encode the NPDSCH for transmission in the special subframe and the downlink subframe immediately before the special subframe in accordance with a rate match based on a number of symbol periods that is a sum of a number of symbol periods of the downlink subframe immediately before the special subframe, and a number of symbol periods of the DwPTS.

In Example 16, the subject matter of one or any combination of Examples 14-15, wherein the processing circuitry may be further configured to, if the number of repetitions is greater than one, if the downlink subframe immediately before the special subframe is not selected for the transmission of the NPDSCH, and if the special subframe and a next downlink subframe after the special subframe are selected for the transmission of the NPDSCH: encode the NPDSCH for transmission in the special subframe and the next downlink subframe in accordance with a rate match based on a number of symbol periods that is a sum of a number of symbol periods of the next downlink subframe, and a number of symbol periods of the DwPTS.

In Example 17, the subject matter of one or any combination of Examples 14-16, wherein the processing circuitry may be further configured to, if the number of repetitions is equal to one: encode the NPDSCH for transmission in the special subframe based on a rate match to the number of symbol periods of the DwPTS.

In Example 18, the subject matter of one or any combination of Examples 14-17, wherein the processing circuitry may be further configured to select, from a plurality of candidate configurations, a configuration for the radio frame. The processing circuitry may be further configured to encode, for transmission, a system information block type-1 narrowband (SIB1-NB) that indicates the selected configuration for the radio frame.

In Example 19, the subject matter of one or any combination of Examples 14-18, wherein the processing circuitry may be further configured to encode the SIB1-NB to further indicate a configuration for the special subframe that is based on one or more of: a number of symbol periods for the DwPTS, a number of symbol periods for the GP, and a number of symbol periods for the UpPTS.

In Example 20, the subject matter of one or any combination of Examples 14-19, wherein the gNB may be arranged to operate in accordance with a further enhanced narrowband internet-of-things (feNB-IoT) protocol. Candidate configurations for the special subframe in the feNB-IoT protocol may be the same as candidate configurations for the special subframe in a legacy protocol.

In Example 21, the subject matter of one or any combination of Examples 14-20, wherein the processing circuitry may be further configured to select the configuration for the radio frame based on one or more of: an amount of downlink data to be transmitted to one or more User Equipments (UEs), and an amount of uplink data to be transmitted by the one or more UEs.

In Example 22, the subject matter of one or any combination of Examples 14-21, wherein at least one of the candidate configurations may be configurable to include two or more special subframes.

In Example 23, the subject matter of one or any combination of Examples 14-22, wherein for each of the candidate configurations, the radio frame may include ten subframes, comprising: one or more uplink subframes, at least four downlink subframes, and a special subframe.

In Example 24, the subject matter of one or any combination of Examples 14-23, wherein the gNB may be arranged to operate in accordance with a further enhanced narrowband internet-of-things (feNB-IoT) protocol. The radio frame may include ten subframes. The candidate configurations may include legacy configurations indexed between one and five. The legacy configurations indexed between one and five may include at least four downlink subframes. The candidate configurations may include legacy configurations indexed by zero and six. The legacy configurations indexed by zero and six may include less than four downlink subframes.

In Example 25, the subject matter of one or any combination of Examples 14-24, wherein the processing circuitry may be further configured to schedule either a downlink transmission during the DwPTS or an uplink transmission during the UpPTS. The processing circuitry may be further configured to refrain from scheduling both a downlink transmission during the DwPTS and an uplink transmission during the UpPTS.

In Example 26, the subject matter of one or any combination of Examples 14-25, wherein the processing circuitry may be further configured to allocate the UpPTS for narrowband physical random access channel (NPRACH) transmissions. The processing circuitry may be further configured to refrain from scheduling downlink transmissions during the DwPTS.

In Example 27, the subject matter of one or any combination of Examples 14-26, wherein the special subframe and the downlink subframes may include 14 symbol periods. The processing circuitry may be further configured to encode first narrowband reference signals (NRSs) for transmission in a first plurality of symbol periods of the downlink subframes. Symbol periods of the downlink subframes may be indexed by 0-13, and the first plurality of symbol periods may be indexed by 5, 6, 12, and 13. The processing circuitry may be further configured to encode second NRSs for transmission in a second plurality of symbol periods of the DwPTS. Symbol periods of the DwPTS may be indexed by 0-13, and the second plurality of symbol periods may be indexed by 5, 6, 9, and 10.

In Example 28, an apparatus of a generation Node-B (gNB) may comprise memory. The apparatus may further comprise processing circuitry. The processing circuitry may be configured to determine, for transmission of a narrowband physical downlink shared channel (NPDSCH), one or more subframes of a radio frame configured for time-division duplexing (TDD) operation. The radio frame may include one or more downlink subframes, one or more uplink subframes, and a special subframe immediately after one of the downlink subframes and immediately before one of the uplink subframes. The special subframe may comprise a downlink portion (DwPTS), a guard period (GP), and an uplink portion (UpPTS). The processing circuitry may be further configured to, if the one or more subframes determined for the transmission of the NDPSCH includes the special subframe, encode the NPDSCH for transmission in accordance with a rate match operation for: the special subframe and a downlink subframe immediately before the special subframe, or the special subframe and a next downlink subframe after the special subframe. The memory may be configured to store the NPDSCH.

In Example 29, the subject matter of Example 28, wherein the rate match operation may be based on a number of symbol periods that is based on a sum of: a number of symbol periods per downlink subframe, and a number of symbol periods of the DwPTS.

In Example 30, an apparatus of a generation Node-B (gNB) may comprise means for encoding a narrowband physical downlink control channel (NPDCCH) for transmission in a special subframe of a radio frame. The radio frame may be configured for time-division duplexing (TDD) operation. The special subframe may occur immediately after a downlink subframe of the radio frame and immediately before an uplink subframe of the radio frame. The special subframe may include a downlink portion (DwPTS), followed by a guard period (GP), followed by an uplink portion (UpPTS). The apparatus may further comprise means for, if a number of repetitions of the NPDCCH is greater than one: puncturing the NPDCCH for transmission in the DwPTS in accordance with a rate match for the downlink subframe, the NPDCCH punctured in symbol periods of the GP and the UpPTS. The apparatus may further comprise means for, if the number of repetitions of the NPDCCH is equal to one: rate matching the NPDCCH for transmission in the DwPTS.

In Example 31, the subject matter of Example 30, wherein the apparatus may further comprise means for determining the number of repetitions of the NPDCCH based at least partly on a target decoding performance level at a User Equipment (UE).

In Example 31, an apparatus of an enhanced node B (eNB) configured for communicating with a narrowband Internet-of-Things NB-IoT User Equipment (UE), the apparatus comprising: memory; and processing circuitry, configured to: encode radio-resource control (RRC) signalling for transmission to the NB-IoT UE, the RRC signalling indicating a subframe configuration for a radio frame configured for time-division duplexing (TDD) operation, the subframe configuration comprising: one or more downlink subframes reserved for downlink transmission, one or more uplink subframes reserved for uplink transmission, and one or more special subframes, wherein each of the one or more special subframes follows one of the downlink subframes and precedes one of the uplink subframes within the radio frame, wherein each of the one or more special subframes comprises a downlink portion (DwPTS) reserved for downlink transmission, a guard period (GP), and an uplink portion (UpPTS) reserved from uplink transmission. The processing circuitry is further configured to: encode a narrowband physical downlink control channel (NPDCCH) with DCI format N1 or N2 for transmission to the NB-IoT UE, the DCI format indicating a number of repetitions of a narrowband physical downlink shared channel (NPDSCH) in one or more consecutive subframes, the one or more consecutive subframes including one or more special subframes; and map the NPDSCH to resource elements in the one or more subframes including resource elements of one or more special subframes. If the number of repetitions is greater than one, resource elements, of the one or more special subframes that are not part of a DwPTS, are counted but are not used in mapping, and if the number of repetitions is equal to one, the resource elements, of the one or more special subframes that are not part of a DwPTS, are not counted or used in the mapping. The processing circuitry is further to configure the eNB to transmit the encoded NPDSCH in the one or more subframes including one or more special subframes in accordance with the mapping. The memory is configured to store the number of repetitions.

In Example 32, the apparatus of Example 31, wherein the subframe configuration is one of a plurality of Uplink-Downlink configurations, wherein the indicated subframe configuration has at least four downlink subframes per radio frame.

In Example 33, the apparatus of Example 32 wherein the RRC signaling comprises a system information block type-1 narrowband (SIB1-NB) for transmission to the NB-IoT UE, the SIB1-NB indicating the subframe configuration for the TDD operation.

In Example 34, the apparatus of Example 33, wherein for each of the one or more special subframes, the GP follows the DwPTS and precedes the UpPTS. Uplink-Downlink configurations 0 and 6 of the plurality are not supported by the NB-IoT UE.

In Example 35, the apparatus of Example 31 wherein if the number of repetitions is greater than one, the processing circuitry is configured to perform rate-matching to map symbols of the NPDSCH to resource elements in the one or more subframes including resource elements of one or more special subframes, wherein resource elements, of the one or more special subframes that are not part of a DwPTS, are counted for the performance of the rate matching. In this Example, the processing circuitry is to configure the eNB to refrain from transmission of the NPDSCH in resource elements of the one or more special subframes that are not part of a DwPTS that were counted for the performance of the rate matching by puncturing symbols mapped to resource elements of the one or more special subframes that are not part of a DwPTS.

In Example 36, the apparatus of Example 31 wherein the processing circuitry is configured to perform rate-matching to map symbols of the NPDSCH to resource elements in the one or more subframes including resource elements of one or more special subframes. Resource elements, of the one or more special subframes that are not part of a DwPTS, are counted for the performance of the rate matching if the number of repetitions is greater than one. Resource elements, of the one or more special subframes that are not part of a DwPTS, are not counted for the performance of the rate matching if the number of repetitions is equal to one. The processing circuitry is to configure the eNB to refrain from transmission of the NPDSCH in resource elements of the one or more special subframes that are not part of a DwPTS that were counted for the performance of the rate matching by puncturing symbols mapped to resource elements of the one or more special subframes that are not part of a DwPTS.

In Example 37, the apparatus of Example 31, wherein if the number of repetitions is greater than one, the resource elements, of the one or more special subframes that are not part of a DwPTS, are counted as part of a sequence of symbols but are excluded from the mapping. If the number of repetitions is equal to one, the resource elements, of the one or more special subframes that are not part of a DwPTS, are not counted as part of the sequence of symbols for the mapping.

In Example 38, the apparatus of Example 31 wherein resource elements, of the one or more special subframes, that are part of a DwPTS are counted and are used in the mapping. The eNB is configured to transmit symbols of the NPDSCH that are mapped to the resource elements, of the one or more special subframes, that are part of a DwPTS in accordance with the mapping.

In Example 39, the apparatus according to Example 31, wherein the one or more special subframes and the downlink subframes include 14 symbol periods. The processing circuitry is further configured to: encode first narrowband reference signals (NRSs) in a first plurality of symbol periods of the downlink subframes, wherein the symbol periods of the downlink subframes are indexed by 0-13, and the first plurality of symbol periods are indexed by 5, 6, 12, and 13; and encode second NRSs in a second plurality of symbol periods of the DwPTS, wherein the symbol periods of the DwPTS are indexed by 0-13, and the second plurality of symbol periods are indexed by 5, 6, 9, and 10.

In Example 40, the apparatus of Example 31, wherein the eNB is configured for one or more repetitions of the NPDCCH in one or more consecutive subframes including one or more special subframes. The processing circuitry is configured to map the NPDCCH to resource elements in the one or more subframes including resource elements of one or more special subframes. If the number of repetitions of the NPDCCH is greater than one, resource elements, of the one or more special subframes that are not part of a DwPTS, are counted but are not used in mapping. If the number of repetitions of the NPDCCH is equal to one, the resource elements, of the one or more special subframes that are not part of a DwPTS, are not counted or used in the mapping. The processing circuitry is to configure the eNB to transmit the encoded NPDCCH in the one or more subframes including one or more special subframes in accordance with the mapping.

In Example 41, the apparatus of Example 40, wherein the processing circuitry is configured to perform rate-matching to map symbols of the NPDCCH to resource elements in the one or more subframes including resource elements of one or more special subframes. Resource elements, of the one or more special subframes that are not part of a DwPTS, are counted for the performance of the rate matching if the number of repetitions of the NPDCCH is greater than one. Resource elements, of the one or more special subframes that are not part of a DwPTS, are not counted for the performance of the rate matching if the number of repetitions of the NPDCCH is equal to one. The processing circuitry is to configure the eNB to refrain from transmission of the NPDCCH in resource elements of the one or more special subframes that are not part of a DwPTS that were counted for the performance of the rate matching by puncturing symbols mapped to resource elements of the one or more special subframes that are not part of a DwPTS.

In Example 42, a non-transitory computer-readable storage medium that stores instructions for execution by processing circuitry of enhanced node B (eNB) configured for communicating with a narrowband Internet-of-Things NB-IoT User Equipment (UE), the instructions to configure the eNB to perform operations to encode radio-resource control (RRC) signalling for transmission to the NB-IoT UE, the RRC signalling indicating a subframe configuration for a radio frame configured for time-division duplexing (TDD) operation. The subframe configuration comprises: one or more downlink subframes reserved for downlink transmission, one or more uplink subframes reserved for uplink transmission, and one or more special subframes, wherein each of the one or more special subframes follows one of the downlink subframes and precedes one of the uplink subframes within the radio frame. Each of the one or more special subframes comprises a downlink portion (DwPTS)

reserved for downlink transmission, a guard period (GP), and an uplink portion (UpPTS) reserved from uplink transmission. The instructions further configure the eNB to encode a narrowband physical downlink control channel (NPDCCH) with DCI format N1 or N2 for transmission to the NB-IoT UE, the DCI format indicating a number of repetitions of a narrowband physical downlink shared channel (NPDSCH) in one or more consecutive subframes, the one or more consecutive subframes including one or more special subframes. The instructions further configure the eNB to map the NPDSCH to resource elements in the one or more subframes including resource elements of one or more special subframes. If the number of repetitions is greater than one, resource elements, of the one or more special subframes that are not part of a DwPTS, are counted but are not used in mapping. If the number of repetitions is equal to one, the resource elements, of the one or more special subframes that are not part of a DwPTS, are not counted or used in the mapping. The eNB is to transmit the encoded NPDSCH in the one or more subframes including one or more special subframes in accordance with the mapping.

In Example 43, an apparatus of a narrowband Internet-of-Things NB-IoT User Equipment (UE), the apparatus comprising: memory; and processing circuitry, configured to decode radio-resource control (RRC) signalling from an enhanced node B (eNB), the RRC signalling indicating a subframe configuration for a radio frame configured for time-division duplexing (TDD) operation. The subframe configuration comprises: one or more downlink subframes reserved for downlink transmission, one or more uplink subframes reserved for uplink transmission, and one or more special subframes, wherein each of the one or more special subframes follows one of the downlink subframes and precedes one of the uplink subframes within the radio frame. Each of the one or more special subframes comprises a downlink portion (DwPTS) reserved for downlink transmission, a guard period (GP), and an uplink portion (UpPTS) reserved from uplink transmission. The processing circuitry is further configured to decode a narrowband physical downlink control channel (NPDCCH) with DCI format N1 or N2 received from the eNB, the DCI format indicating a number of repetitions of a narrowband physical downlink shared channel (NPDSCH) in one or more consecutive subframes, the one or more consecutive subframes including one or more special subframes. The processing circuitry is further configured to decode the NPDSCH received in the one or more subframes including one or more special subframes, wherein to decode the NPDSCH, the processing circuitry is configured to demap the NPDSCH received in resource elements in the one or more subframes including resource elements of one or more special subframes. If the number of repetitions is greater than one, resource elements, of the one or more special subframes that are not part of a DwPTS, are counted but are not used in demapping. If the number of repetitions is equal to one, the resource elements, of the one or more special subframes that are not part of a DwPTS, are not counted or used in the demapping. The memory is configured to store the number of repetitions.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an enhanced node B (eNB) configured for communicating with a narrowband Internet-of-Things NB-IoT User Equipment (UE), the apparatus comprising: memory; and processing circuitry, configured to:
   encode radio-resource control (RRC) signalling for transmission to the NB-IoT UE, the RRC signalling indicating a subframe configuration for a radio frame configured for time-division duplexing (TDD) operation,
   the subframe configuration comprising: one or more downlink subframes reserved for downlink transmission, one or more uplink subframes reserved for uplink transmission, and one or more special subframes, wherein each of the one or more special subframes follows one of the downlink subframes and precedes one of the uplink subframes within the radio frame,
   wherein each of the one or more special subframes comprises a downlink portion (DwPTS) reserved for downlink transmission, a guard period (GP), and an uplink portion (UpPTS) reserved from uplink transmission;
   encode a narrowband physical downlink control channel (NPDCCH) with DCI format N1 or N2 for transmission to the NB-IoT UE, the DCI format indicating a number of consecutive subframes for transmission of a narrowband physical downlink shared channel (NPDSCH) and a repetition number indicating a number of times within each of the consecutive subframes that the NPDSCH is to be repeated, the consecutive subframes including one or more special subframes;
   wherein if the repetition number is greater than one, count resource elements in consecutive subframes up to the number of consecutive subframes indicated by the DCI wherein resource elements of the one or more special subframes that are not part of a DwPTS, are counted but are not used in mapping, and
   wherein if the repetition number is equal to one, count resource elements in consecutive subframes up to the number of consecutive subframes indicated by the DCI wherein the resource elements of the one or more special subframes that are not part of a DwPTS, are not counted nor used in the mapping;
   map symbols of the NPDSCH to the counted resource elements in the consecutive subframes excluding any counted resource elements of the one or more special subframes that are not part of a DwPTS; and
   configure the eNB to transmit the encoded NPDSCH in the one or more subframes including one or more special subframes in accordance with the mapping,
   wherein the memory is configured to store the repetition number.

2. The apparatus of claim 1, wherein the subframe configuration is one of a plurality of Uplink-Downlink configurations, wherein the indicated subframe configuration has at least four downlink subframes per radio frame.

3. The apparatus of claim 2 wherein the RRC signaling comprises a system information block type-1 narrowband (SIB1-NB) for transmission to the NB-IoT UE, the SIB1-NB indicating the subframe configuration for the TDD operation.

4. The apparatus of claim 3, wherein for each of the one or more special subframes, the GP follows the DwPTS and precedes the UpPTS, and
   wherein Uplink-Downlink configurations 0 and 6 of the plurality are not supported by the NB-IoT UE.

5. The apparatus of claim 1 wherein if the repetition number is greater than one, the processing circuitry is configured to:
perform rate-matching to map symbols of the NPDSCH to resource elements in the one or more subframes including resource elements of one or more special subframes, wherein resource elements, of the one or more special subframes that are not part of a DwPTS, are counted for the performance of the rate matching; and
configure the eNB to refrain from transmission of the NPDSCH in resource elements of the one or more special subframes that are not part of a DwPTS that were counted for the performance of the rate matching by puncturing symbols mapped to resource elements of the one or more special subframes that are not part of a DwPTS.

6. The apparatus of claim 1 wherein the processing circuitry is configured to:
perform rate-matching to map symbols of the NPDSCH to resource elements in the one or more subframes including resource elements of one or more special subframes,
wherein resource elements, of the one or more special subframes that are not part of a DwPTS, are counted for the performance of the rate matching if the repetition number is greater than one; and
wherein resource elements, of the one or more special subframes that are not part of a DwPTS, are not counted for the performance of the rate matching if the repetition number is equal to one, and
configure the eNB to refrain from transmission of the NPDSCH in resource elements of the one or more special subframes that are not part of a DwPTS that were counted for the performance of the rate matching by puncturing symbols mapped to resource elements of the one or more special subframes that are not part of a DwPTS.

7. The apparatus of claim 1, wherein if the repetition number is greater than one, the resource elements, of the one or more special subframes that are not part of a DwPTS, are counted as part of a sequence of symbols but are excluded from the mapping, and
wherein if the repetition number is equal to one, the resource elements, of the one or more special subframes that are not part of a DwPTS, are not counted as part of the sequence of symbols for the mapping.

8. The apparatus of claim 1 wherein resource elements, of the one or more special subframes, that are part of a DwPTS are counted and are used in the mapping, and
wherein the eNB is configured to transmit symbols of the NPDSCH that are mapped to the resource elements, of the one or more special subframes, that are part of a DwPTS in accordance with the mapping.

9. The apparatus according to claim 1, wherein;
the one or more special subframes and the downlink subframes include 14 symbol periods,
the processing circuitry is further configured to:
encode first narrowband reference signals (NRSs) in a first plurality of symbol periods of the downlink subframes, wherein the symbol periods of the downlink subframes are indexed by 0-13, and the first plurality of symbol periods are indexed by 5, 6, 12, and 13; and
encode second NRSs in a second plurality of symbol periods of the DwPTS, wherein the symbol periods of the DwPTS are indexed by 0-13, and the second plurality of symbol periods are indexed by 5, 6, 9, and 10.

10. The apparatus of claim 1, wherein the eNB is configured for one or more repetitions of the NPDCCH in one or more consecutive subframes including one or more special subframes,
wherein the processing circuitry is configured to map the NPDCCH to resource elements in the one or more subframes including resource elements of one or more special subframes,
wherein if the repetition number of the NPDCCH is greater than one, resource elements, of the one or more special subframes that are not part of a DwPTS, are counted but are not used in mapping, and
wherein if the repetition number of the NPDCCH is equal to one, the resource elements, of the one or more special subframes that are not part of a DwPTS, are not counted or used in the mapping; and
the processing circuitry is to configure the eNB to transmit the encoded NPDCCH in the one or more subframes including one or more special subframes in accordance with the mapping.

11. The apparatus of claim 10, wherein the processing circuitry is configured to;
perform rate-matching to map symbols of the NPDCCH to resource elements in the one or more subframes including resource elements of one or more special subframes,
wherein resource elements, of the one or more special subframes that are not part of a DwPTS, are counted for the performance of the rate matching if the repetition number of the NPDCCH is greater than one; and
wherein resource elements, of the one or more special subframes that are not part of a DwPTS, are not counted for the performance of the rate matching if the repetition number of the NPDCCH is equal to one, and
configure the eNB to refrain from transmission of the NPDCCH in resource elements of the one or more special subframes that are not part of a DwPTS that were counted for the performance of the rate matching by puncturing symbols mapped to resource elements of the one or more special subframes that are not part of a DwPTS.

12. The apparatus of claim 11 wherein if the repetition number is greater than one, the processing circuitry is configured to:
perform rate-matching to map symbols of the NPDSCH to resource elements in the one or more subframes including resource elements of one or more special subframes, wherein resource elements, of the one or more special subframes that are not part of a DwPTS, are counted for the performance of the rate matching; and
configure the eNB to refrain from transmission of the NPDSCH in resource elements of the one or more special subframes that are not part of a DwPTS that were counted for the performance of the rate matching by puncturing symbols mapped to resource elements of the one or more special subframes that are not part of a DwPTS.

13. A non-transitory computer-readable storage medium that stores instructions for execution by processing circuitry of enhanced node B (eNB) configured for communicating with a narrowband Internet-of-Things NB-IoT User Equipment (UE), the instructions to configure the eNB to perform operations to:
encode radio-resource control (RRC) signalling for transmission to the NB-IoT UE, the RRC signalling indicating a subframe configuration for a radio frame configured for time-division duplexing (TDD) operation,
the subframe configuration comprising: one or more downlink subframes reserved for downlink transmission, one or more uplink subframes reserved for uplink transmission, and one or more special subframes, wherein each of the one or more special subframes follows one of the downlink subframes and precedes one of the uplink subframes within the radio frame,
wherein each of the one or more special subframes comprises a downlink portion (DwPTS) reserved for downlink transmission, a guard period (GP), and an uplink portion (UpPTS) reserved from uplink transmission;
encode a narrowband physical downlink control channel (NPDCCH) with DCI format N1 or N2 for transmission to the NB-IoT UE, the DCI format indicating a number of consecutive subframes for transmission of a narrowband physical downlink shared channel (NPDSCH) and a repetition number indicating a number of times within each of the consecutive subframes that the NPDSCH is to be repeated, the consecutive subframes including one or more special subframes;
wherein if the repetition number is greater than one, count resource elements in consecutive subframes up to the number of consecutive subframes indicated by the DCI wherein resource elements of the one or more special subframes that are not part of a DwPTS, are counted but are not used in mapping, and
wherein if the repetition number is equal to one, count resource elements in consecutive subframes up to the number of consecutive subframes indicated by the DCI wherein the resource elements of the one or more special subframes that are not part of a DwPTS, are not counted nor used in the mapping;
map symbols of the NPDSCH to the counted resource elements in the consecutive subframes excluding any counted resource elements of the one or more special subframes that are not part of a DwPTS; and
configure the eNB to transmit the encoded NPDSCH in the one or more subframes including one or more special subframes in accordance with the mapping.

14. The non-transitory computer-readable storage medium of claim 13, wherein the subframe configuration is one of a plurality of Uplink-Downlink configurations, and wherein the indicated subframe configuration has at least four downlink subframes per radio frame.

15. The non-transitory computer-readable storage medium of claim 14 wherein the RRC signaling comprises a system information block type-1 narrowband (SIB1-NB) for transmission to the NB-IoT UE, the SIB1-NB indicating the subframe configuration for the TDD operation.

16. The non-transitory computer-readable storage medium of claim 15, wherein for each of the one or more special subframes, the GP follows the DwPTS and precedes the UpPTS, and
wherein Uplink-Downlink configurations 0 and 6 of the plurality are not supported by the NB-IoT UE.

17. An apparatus of a narrowband Internet-of-Things NB-IoT User Equipment (UE), the apparatus comprising: memory; and processing circuitry, configured to:

decode radio-resource control (RRC) signalling from an enhanced node B (eNB), the RRC signalling indicating a subframe configuration for a radio frame configured for time-division duplexing (TDD) operation,
the subframe configuration comprising: one or more downlink subframes reserved for downlink transmission, one or more uplink subframes reserved for uplink transmission, and one or more special subframes, wherein each of the one or more special subframes follows one of the downlink subframes and precedes one of the uplink subframes within the radio frame,
wherein each of the one or more special subframes comprises a downlink portion (DwPTS) reserved for downlink transmission, a guard period (GP), and an uplink portion (UpPTS) reserved from uplink transmission;
decode a narrowband physical downlink control channel (NPDCCH) with DCI format N1 or N2 received from the eNB, the DCI format indicating a number of consecutive subframes for transmission of a narrowband physical downlink shared channel (NPDSCH) and a repetition number indicating a number of times within each of the consecutive subframes, the one or more consecutive subframes that the NPDSCH is to be repeated including the special subframes;
decode the NPDSCH received in the one or more subframes including one or more special subframes,
wherein if the repetition number is greater than one, count resource elements in consecutive subframes up to the number of consecutive subframes indicated by the DCI wherein resource elements, of the one or more special subframes that are not part of a DwPTS are counted but are not used in demapping, and
wherein if the repetition number is equal to one, count the resource elements in consecutive subframes up to the number of consecutive subframes indicated by the DCL wherein the resource elements, of the one or more special subframes that are not part of a DwPTS, are not counted or used in the demapping; and
wherein to decode the NPDSCH, the processing circuitry is configured to demap symbols of the NPDSCH in the counted resource elements in the consecutive subframes excluding any counted resource elements of the one or more special subframes that are not part of a DwPTS,
wherein the memory is configured to store the repetition number.

18. The apparatus of claim 17 wherein the subframe configuration is one of a plurality of Uplink-Downlink configurations, wherein the indicated subframe configuration has at least four downlink subframes per radio frame.

19. The apparatus of claim 18 wherein the RRC signaling comprises a system information block type-1 narrowband (SIB1-NB) for decoding by the NB-IoT UE, the SIB1-NB indicating the subframe configuration for the TDD operation.

20. The apparatus of claim 19, wherein for each of the one or more special subframes, the GP follows the DwPTS and precedes the UpPTS, and
wherein Uplink-Downlink configurations 0 and 6 of the plurality are not supported by the NB-IoT UE.

* * * * *

UNITED STATES PATENT AND TRADEMARK OFFICE
CERTIFICATE OF CORRECTION

PATENT NO. : 11,272,492 B2
APPLICATION NO. : 16/629436
DATED : March 8, 2022
INVENTOR(S) : Ye et al.

Page 1 of 1

It is certified that error appears in the above-identified patent and that said Letters Patent is hereby corrected as shown below:

In the Claims

Column 41, Line 54, Claim 9, delete "wherein;" and insert --wherein:-- therefor

Column 42, Line 23, Claim 11, delete "to;" and insert --to:-- therefor

Column 44, Line 36, Claim 17, delete "DCL" and insert --DCI,-- therefor

Signed and Sealed this
Tenth Day of May, 2022

Katherine Kelly Vidal
*Director of the United States Patent and Trademark Office*